(12) United States Patent
Hsu et al.

(10) Patent No.: US 11,899,350 B2
(45) Date of Patent: Feb. 13, 2024

(54) WAVELENGTH CONVERSION MODULE WITH HEAT INSULATION LAYERS AND PROJECTOR INCLUDING THEREOF

(71) Applicant: Coretronic Corporation, Hsin-Chu (TW)

(72) Inventors: Pi-Tsung Hsu, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 110 days.

(21) Appl. No.: 17/557,064

(22) Filed: Dec. 21, 2021

(65) Prior Publication Data
US 2022/0229354 A1 Jul. 21, 2022

(30) Foreign Application Priority Data

Jan. 20, 2021 (CN) .......................... 202110072577.3

(51) Int. Cl.
*G03B 21/20* (2006.01)
*G03B 21/16* (2006.01)
*G02B 26/00* (2006.01)

(52) U.S. Cl.
CPC ......... *G03B 21/204* (2013.01); *G02B 26/008* (2013.01); *G03B 21/16* (2013.01)

(58) Field of Classification Search
CPC ............................ G03B 21/204; G02B 26/008
See application file for complete search history.

(56) References Cited

U.S. PATENT DOCUMENTS

| 2016/0077325 | A1* | 3/2016 | Tsai | H04N 9/3114 |
| | | | | 353/31 |
| 2017/0180686 | A1* | 6/2017 | Chen | G02B 26/008 |
| 2017/0293211 | A1* | 10/2017 | Kobayashi | G03B 21/16 |
| 2018/0149957 | A1 | 5/2018 | Maeda | |

(Continued)

FOREIGN PATENT DOCUMENTS

| CN | 1462906 | 12/2003 |
| CN | 201634747 | 11/2010 |
| CN | 202432440 | 9/2012 |

(Continued)

OTHER PUBLICATIONS

"Office Action of China Counterpart Application", dated Oct. 26, 2023, p. 1-p. 14.

*Primary Examiner* — Bao-Luan Q Le
(74) *Attorney, Agent, or Firm* — JCIPRNET

(57) ABSTRACT

A wavelength conversion module including a wavelength conversion wheel, a driver, and a weight member is provided. The wavelength conversion wheel includes a rotating plate, and the rotating plate has a first side and a second side opposite to each other. The driver is connected to the first side of the rotating plate, and drives the rotating plate to rotate around a rotation shaft of the driver as an axis. The weight member is attached to the second side of the rotating plate and rotates synchronously with the rotating plate. The rotating plate comprises a heat insulation region and a heat dissipation region. The heat insulation region and the heat dissipation region do not overlap each other. The heat insulation region comprises a first heat insulation region located at the first side and a second heat insulation region located at the second side.

14 Claims, 30 Drawing Sheets

(56) References Cited

U.S. PATENT DOCUMENTS

2019/0302592 A1    10/2019   Shimizu et al.
2020/0004118 A1     1/2020   Hsu et al.

FOREIGN PATENT DOCUMENTS

| | | |
|---|---|---|
| CN | 202546620 | 11/2012 |
| CN | 202631938 | 12/2012 |
| CN | 104516177 | 4/2015 |
| CN | 104566229 | 4/2015 |
| CN | 105351887 | 2/2016 |
| CN | 205374967 | 7/2016 |
| CN | 106199947 | 12/2016 |
| CN | 106796387 | 5/2017 |
| CN | 106896631 | 6/2017 |
| CN | 208903064 | 5/2019 |
| CN | 208937891 | 6/2019 |
| CN | 111077667 | 4/2020 |
| CN | 111258161 | 6/2020 |
| JP | 2008051919 | 3/2008 |
| TW | 585257 | 4/2004 |
| TW | 201906195 | 2/2019 |
| TW | 202006456 | 2/2020 |
| WO | 2018103209 | 6/2018 |

\* cited by examiner

WAVELENGTH CONVERSION MODULE WITH HEAT INSULATION LAYERS AND PROJECTOR INCLUDING THEREOF

CROSS-REFERENCE TO RELATED APPLICATION

This application claims the priority benefit of China application serial no. 202110072577.3, filed on Jan. 20, 2021. The entirety of the above-mentioned patent application is hereby incorporated by reference herein and made a part of this specification.

BACKGROUND

Technical Field

The disclosure relates to an optical module and a projector, and more particularly, to a wavelength conversion module and a projector having the wavelength conversion module.

Description of Related Art

In a device of a solid state illumination laser (SSI Laser) projector, a phosphor wheel is located on a transmission path of an exciting beam of a light source module, and a blue laser beam emitted by a blue laser light source is projected on a light conversion region of the phosphor wheel so as to be excited to emit a yellow conversion beam, thereby achieving the purpose of synthesizing white light. In general, a metal weight ring may be additionally assembled to the structure of the phosphor wheel for subsequent balance correction, and the metal weight ring may also be filled with balancing substances or glue, etc. However, the balancing substances or glue filled in/on the metal weight ring may receive the heat energy from the heat dissipation substrate and result in degradation, thereby reducing the reliability of the structure of the phosphor wheel. In addition, the structure of the metal weight ring is more complicated, and the production cost is also higher. The structure of the phosphor wheel may not be simplified due to the limitation of the metal weight ring, which tends to result in vibration and noise during the operation of the phosphor wheel, and thus affects the quality and the service life of the phosphor wheel.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a wavelength conversion module with a higher reliability.

The disclosure further provides a projector, which includes the wavelength conversion module, and has a higher reliability and a longer service life.

Other objects and advantages of the disclosure may be further understood from the technical features disclosed herein.

In order to achieve one, a part, or all of the above objectives or other objectives, an embodiment of the disclosure provides a wavelength conversion module, including a wavelength conversion wheel, a driver, and a weight member. The wavelength conversion wheel includes a rotating plate, and the rotating plate has a first side and a second side opposite to each other. The driver is connected to the first side of the rotating plate, and the driver drives the rotating plate to rotate around a rotation shaft of the driver as an axis. The weight member is attached to the second side of the rotating plate, and the weight member rotates synchronously with the rotating plate around the rotation shaft as the axis. The rotating plate includes a heat insulation region and a heat dissipation region. The heat insulation region and the heat dissipation region do not overlap each other. The heat insulation region includes a first heat insulation region and a second heat insulation region. The first heat insulation region is located at the first side of the rotating plate and corresponds to a connection position of the driver. The second heat insulation region is located at the second side of the rotating plate and corresponds to a connection position of the weight member.

In order to achieve one, a part, or all of the above objectives or other objectives, an embodiment of the disclosure provides a wavelength conversion module, including a wavelength conversion wheel and a driver. The wavelength conversion wheel includes a rotating plate. The rotating plate has a first side and a second side opposite to each other, and the rotating plate includes an annular recess hole that is recessed from the second side toward the first side. The driver is connected to the first side of the rotating plate, and the driver drives the rotating plate to rotate around a rotation shaft of the driver as an axis. The rotating plate includes a heat insulation region and a heat dissipation region. The heat insulation region and the heat dissipation region do not overlap each other. The heat insulation region includes a first heat insulation region and a second heat insulation region. The first heat insulation region is located at the first side of the rotating plate and corresponds to a connection position of the driver, while the second heat insulation region corresponds to a position of the annular recess hole.

In order to achieve one, a part, or all of the above objectives or other objectives, an embodiment of the disclosure provides a projector, including an illumination module, a light valve, and a projection lens. The illumination module is configured to provide an illumination beam. The illumination module includes a light source device and a wavelength conversion module. The light source device is configured to provide an exciting beam. The wavelength conversion module receives the exciting beam and is disposed on a transmission path of the exciting beam. The illumination beam includes at least a portion of the exciting beam emitted from the wavelength conversion module. The wavelength conversion module includes a wavelength conversion wheel, a driver, and a weight member. The wavelength conversion wheel includes a rotating plate, and the rotating plate has a first side and a second side opposite to each other. The driver is connected to the first side of the rotating plate, and the driver drives the rotating plate to rotate around a rotation shaft of the driver as an axis. The weight member is attached to the second side of the rotating plate, and the weight member rotates synchronously with the rotating plate around the rotation shaft as the axis. The rotating plate includes a heat insulation region and a heat dissipation region. The heat insulation region and the heat dissipation region do not overlap each other. The heat insulation region includes a first heat insulation region and a second heat insulation region. The first heat insulation region is located at the first side of the rotating plate and corresponds to a connection position of the driver, while the second heat insulation region is located at the second side of the rotating plate and corresponds to a connection position of the weight member. The light valve is disposed on a transmission path of the illumination beam to convert the illumination beam into an image beam. The projection lens is disposed on a transmission path of the image beam to project the image beam out of the projector.

In order to achieve one, a part, or all of the above objectives or other objectives, an embodiment of the disclosure provides a projector, including an illumination module, a light valve, and a projection lens. The illumination module is configured to provide an illumination beam. The illumination module includes a light source device and a wavelength conversion module. The light source device is configured to provide an exciting beam. The wavelength conversion module is disposed on a transmission path of the exciting beam. The illumination beam includes at least a portion of the exciting beam emitted from the wavelength conversion module. The wavelength conversion module includes a wavelength conversion wheel and a driver. The wavelength conversion wheel includes a rotating plate. The rotating plate has a first side and a second side opposite to each other, and the rotating plate includes an annular recess hole that is recessed from the second side toward the first side. The driver is connected to the first side of the rotating plate, and the driver drives the rotating plate to rotate around a rotation shaft of the driver as an axis. The rotating plate includes a heat insulation region and a heat dissipation region. The heat insulation region and the heat dissipation region do not overlap each other. The heat insulation region includes a first heat insulation region and a second heat insulation region. The first heat insulation region is located at the first side of the rotating plate and corresponds to a connection position of the driver, while the second heat insulation region corresponds to a position of the annular recess hole. The light valve is disposed on a transmission path of the illumination beam to convert the illumination beam into an image beam. The projection lens is disposed on a transmission path of the image beam to project the image beam out of the projector.

Based on the above, the embodiments of the disclosure have at least one of the following advantages or effects. In the design of the wavelength conversion module of the disclosure, the rotating plate includes the heat insulation region and the heat dissipation region, and the heat insulation region and the heat dissipation region do not overlap each other. That is, at least two regions with different functional properties of heat insulation and heat dissipation may be disposed on the rotating plate according to requirements, so as to achieve a heat dissipation effect and a heat insulation effect. In addition, the heat insulation region includes the first insulation region located at the first side of the rotating plate and corresponding to the connection position of the driver and the second heat insulation region located at the second side of the rotating plate and corresponding to the connection position of the weight member. In this way, heat energy may be effectively blocked from being transferred to the driver and weight member, which may improve the reliability of the wavelength conversion module of the disclosure. In addition, the projector adopting the wavelength conversion module of the disclosure may have the higher reliability and the longer service life, thereby enhancing the product competitiveness.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
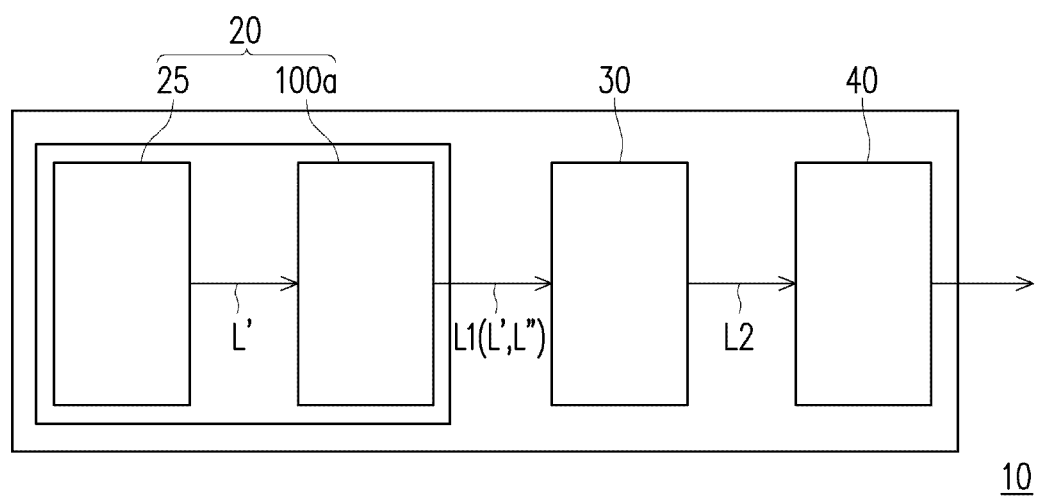
FIG. 1 is a schematic view of a projector according to an embodiment of the disclosure.

FIG. 1 is a schematic view of a projector according to an embodiment of the disclosure. Referring to FIG. 1, in this embodiment, a projector 10 includes an illumination module 20, a light valve 30, and a projection lens 40. The illumination module 20 is configured to provide an illumination beam L1. The illumination module 20 includes a light source device 25 and a wavelength conversion module 100a. The light source device 25 is configured to provide an exciting beam L'. The wavelength conversion module 100a is disposed on a transmission path of the exciting beam L' and receives the exciting beam L'. The wavelength conversion module 100a is configured to convert a wavelength of the exciting beam L' to generate conversion beams L" having different wavelengths. Here, the illumination beam L1 includes at least a portion of the exciting beam L' and the conversion beam L" emitted by the wavelength conversion module 100a. In this embodiment, the exciting beam L' is, for example, a blue beam and the conversion beam L" is, for example, a yellow beam and/or a green beam. The light valve 30 is disposed on a transmission path of the illumination beam L1 to convert the illumination beam L1 into an image beam L2. The projection lens 40 is disposed on a transmission path of the image beam L2 to project the image beam L2 out of the projector 10.

In detail, the light source device 25 used in this embodiment is, for example, a laser diode (LD), such as a laser diode bank. Specifically, any light source that meets the volume requirements according to the actual design may be implemented, and the disclosure is not limited thereto. The light valve 30 is a reflective optical modulator, such as a liquid crystal on silicon panel (LCoS panel) or a digital micro-mirror device (DMD), etc. In an embodiment, the light valve 30 is a transmissive optical modulator, such as a transparent liquid crystal panel, an electro-optical modulator, a magneto-optic modulator, or an acousto-optic modulator (AOM), etc., but the embodiment does not limit forms and the types of the light valve 30. Regarding the method by which the light valve 30 converts the illumination beam L1 into the image beam L2, detailed steps and embodiments of the method may be sufficiently taught, suggested, and implemented by persons with ordinary knowledge in the art. Thus, details in this regard will not be further reiterated in the following. In addition, the projection lens 40 includes, for example, a combination of one or more optical lenses having a diopter, such as various combinations of non-planar lenses including, for example, biconcave lenses, biconvex lenses, concave-convex lenses, convex-concave lenses, plane-convex lenses, and plane-concave lenses, etc. In an embodiment, the projection lens 40 may also include a planar optical lens to convert the image beam L2 from the light valve 30 into a projection beam and project the projection beam out of the projector 10 in a reflective or transmissive manner. Here, the embodiment does not limit forms and types of the projection lens 40.

Figure 2A:
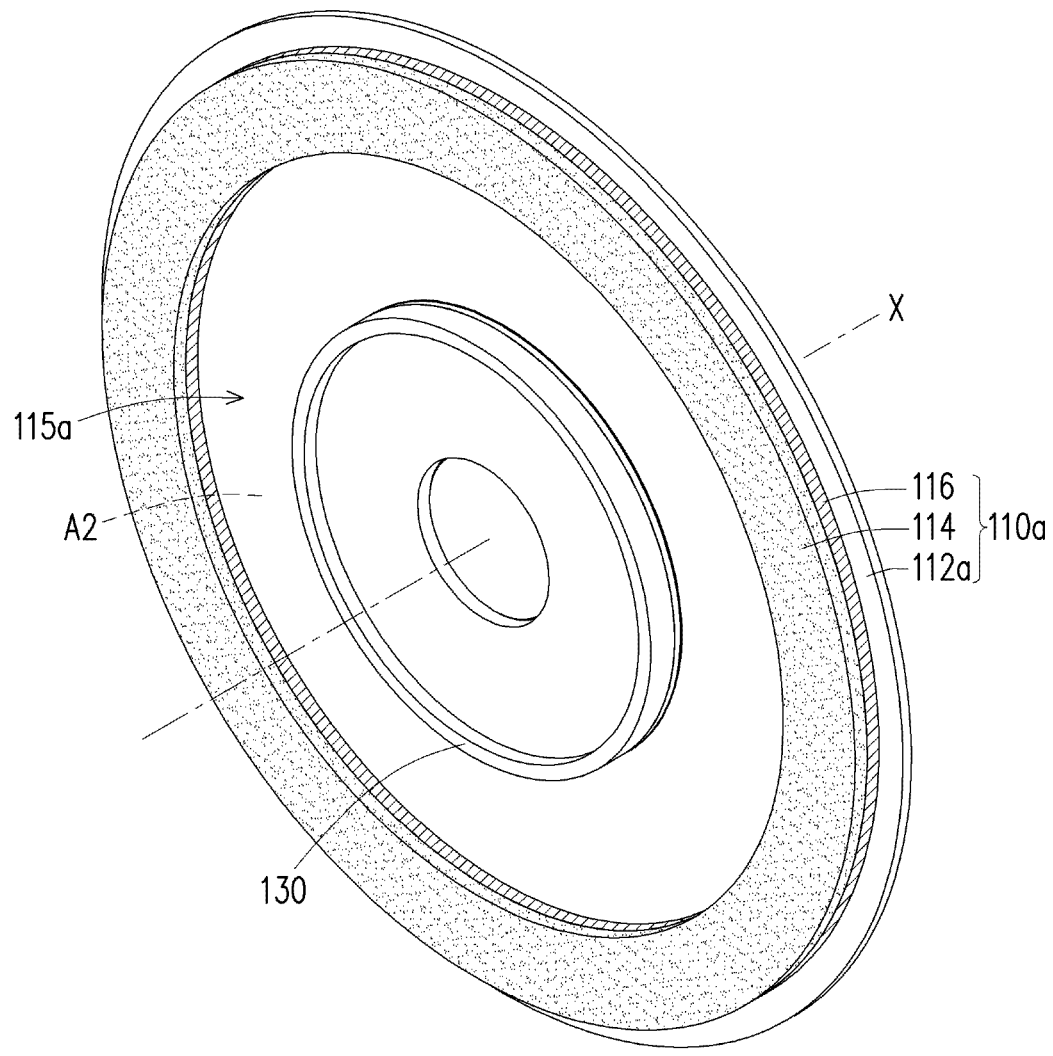
FIGS. 2A and 2B are schematic perspective views of a wavelength conversion module in different viewing angles according to an embodiment of the projector of FIG. 1.
Figure 2B:
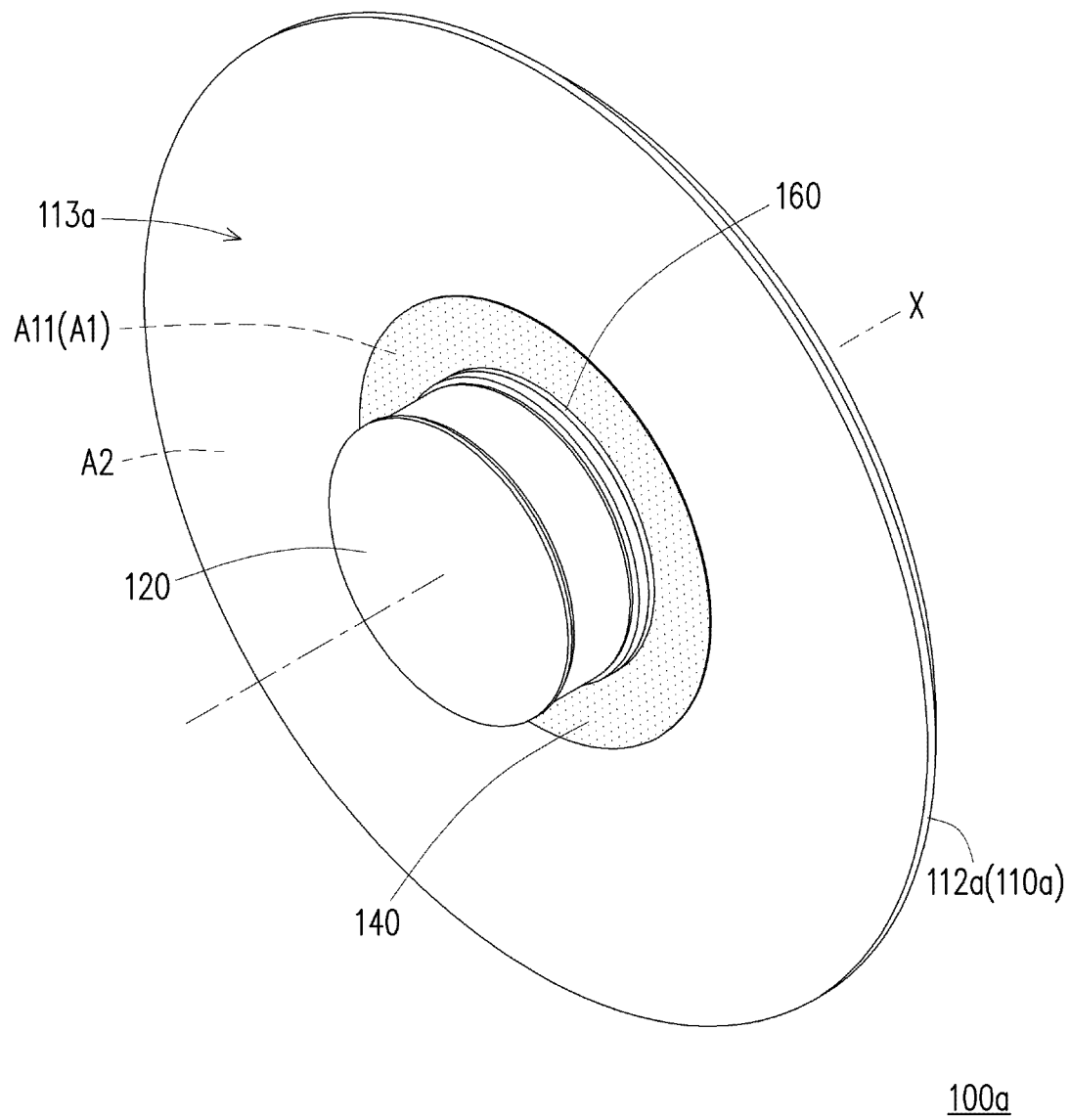
Figure 2C:
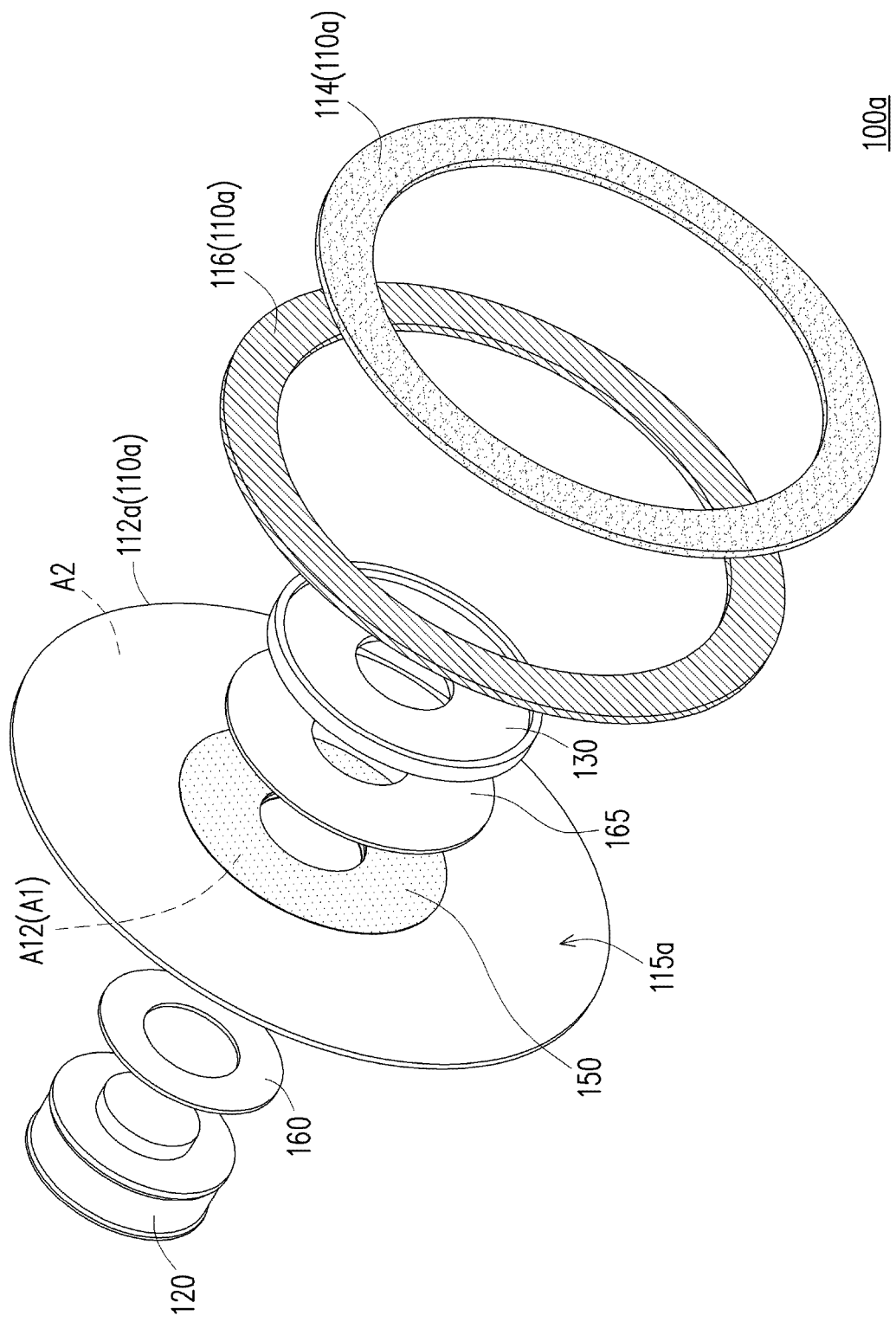
FIGS. 2C and 2D are respectively schematic perspective exploded views of the wavelength conversion module of FIGS. 2A and 2B.
Figure 2D:
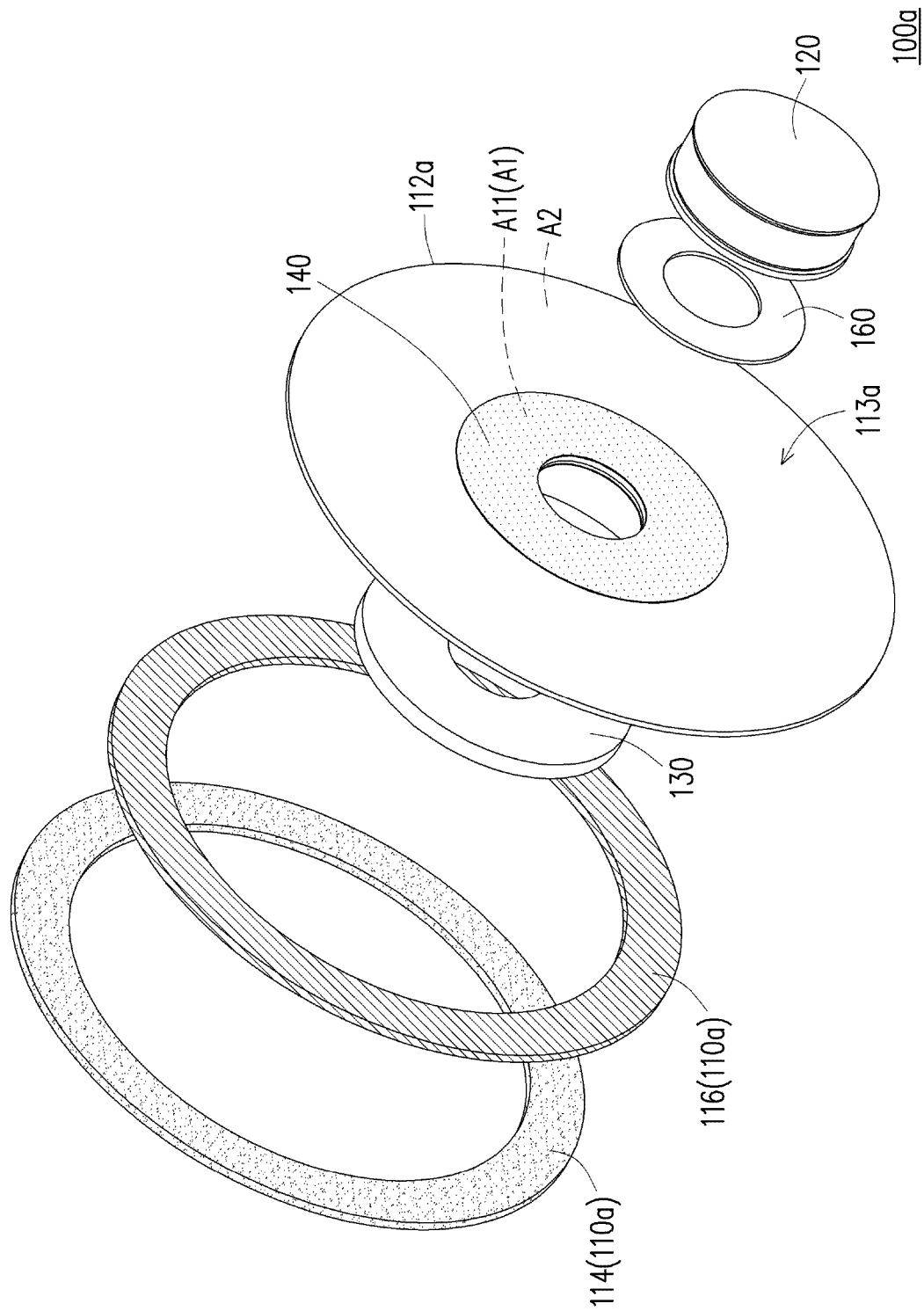
Figure 2E:
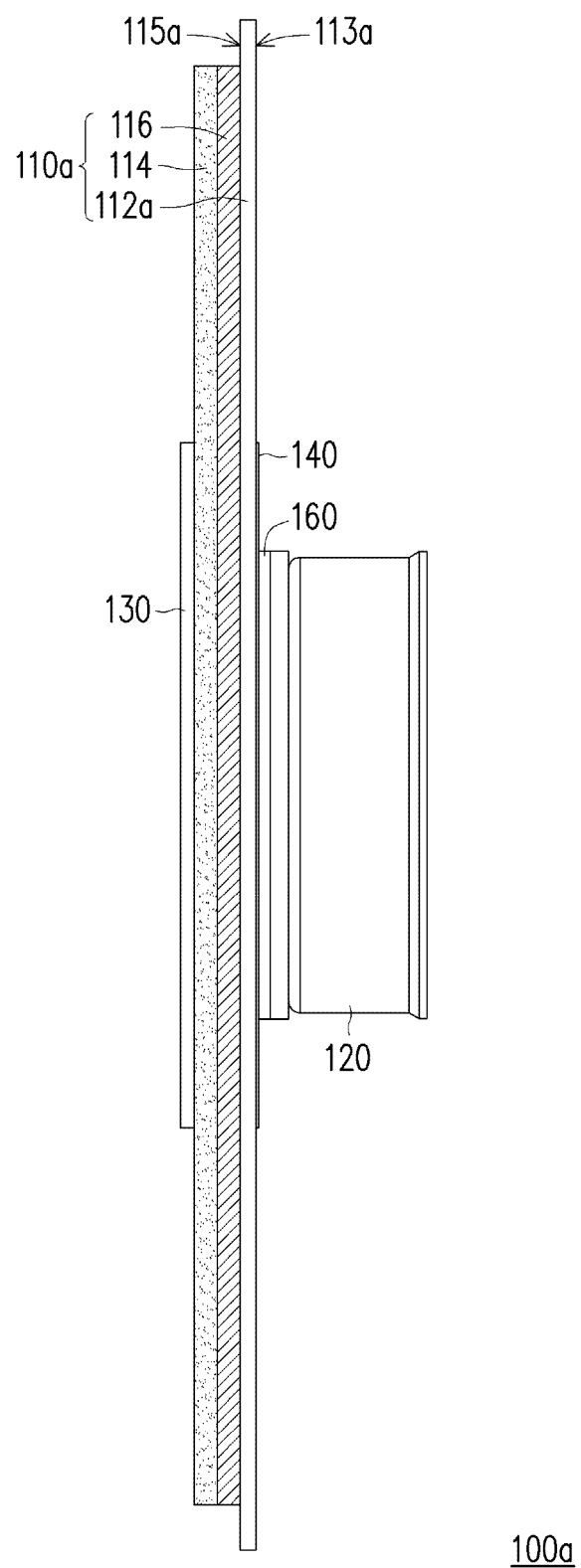
FIG. 2E is a schematic side view of the wavelength conversion module of FIG. 2A.
Figure 2F:
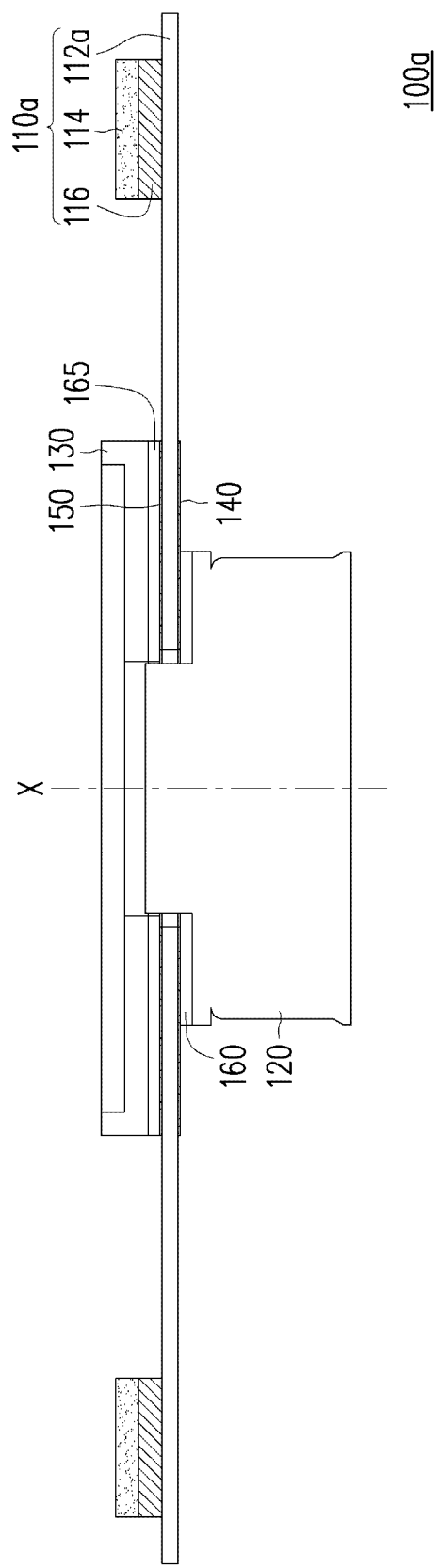
FIG. 2F is a schematic cross-sectional view of the wavelength conversion module of FIG. 2A.

FIGS. 2A and 2B are schematic perspective views of a wavelength conversion module in different viewing angles according to an embodiment of the projector of FIG. 1. FIGS. 2C and 2D are respectively schematic perspective exploded views of the wavelength conversion module of FIGS. 2A and 2B. FIG. 2E is a schematic side view of the wavelength conversion module of FIG. 2A. FIG. 2F is a schematic cross-sectional view of the wavelength conversion module of FIG. 2A.

Referring to FIGS. 2C, 2D, and 2E first, the wavelength conversion module 100a includes a wavelength conversion wheel 110a, a driver 120, and a weight member 130. The wavelength conversion wheel 110a includes a rotating plate 112a, and the rotating plate 112a has a first side 113a and a second side 115a opposite to each other. Referring to FIG. 2B, the driver 120 is connected to the first side 113a of the rotating plate 112a, and drives the rotating plate 112a to rotate around a rotation shaft X of the driver 120 as an axis. Referring to 2A, the weight member 130 is attached to the second side 115a of the rotating plate 112a, and the weight member 130 rotate synchronously with the rotating plate 112a around the rotation shaft X as the axis. In particular, referring to FIGS. 2C and 2D again, the rotating plate 112a includes a heat insulation region A1 and a heat dissipation region A2. The heat insulation region A1 and the heat dissipation region A2 do not overlap each other. Here, a thermal conductivity of the heat insulation region A1 of the rotating plate 112a is different from a thermal conductivity of the heat dissipation region A2. Preferably, the thermal conductivity of the heat insulation region A1 of the rotating plate 112a ranges from 1 W/mK to 180 W/mK. In addition, the heat insulation region A1 of the rotating plate 112a may include a first heat insulation region A11 and a second heat insulation region A12. The first heat insulation region A11 of the heat insulation region A1 is located at the first side 113a of the rotating plate 112a and corresponds to a connection position of the driver 120, while the second heat insulation region A12 of the heat insulation region A1 is located at the second side 115a of the rotating plate 112a and corresponds to a connection position of the weight member 130.

In detail, referring to FIGS. 2A, 2B, and 2F, the rotating plate 112a of this embodiment is, for example, a metal rotating plate, and a material thereof is aluminum, but the disclosure is not limited thereto. Here, a shape of the rotating plate 112a and a shape of the weight member 130 are respectively hollow rings. The rotating plate 112a and the weight member 130 are respectively disposed coaxially with the driver 120. The driver 120 is, for example, a motor, and the weight member 130 is, for example, a metal weight ring, but the disclosure is not limited thereto.

Referring to FIGS. 2A, 2C, and 2E again, the wavelength conversion wheel 110a of this embodiment further includes a wavelength conversion layer 114 and a reflection layer 116. The wavelength conversion layer 114 is disposed at the second side 115a of the rotating plate 112a, and the reflection layer 116 is disposed at the second side 115a of the rotating plate 112a. The wavelength conversion layer 114 and the reflection layer 116 are both located at the heat dissipation region A2, and the reflection layer 116 is located between the rotating plate 112a and the wavelength conversion layer 114. That is, the reflection layer 116 is first disposed at the heat dissipation region A2 of the rotating plate 112a, and the wavelength conversion layer 114 is disposed on the reflection layer 116. Here, the wavelength conversion layer 114 is, for example, a phosphor layer, which is configured to convert the wavelength of the exciting beam L' in FIG. 1 and generate the conversion beams L" having different wavelengths.

Furthermore, the wavelength conversion module 100a of this embodiment further includes a first heat insulation layer 140 and a second heat insulation layer 150. As shown in FIG. 2D, the first heat insulation layer 140 is located at the first heat insulation region A11 of the rotating plate 112a and is disposed between the first side 113a of the rotating plate 112a and the driver 120. As shown in FIG. 2C, the second heat insulation layer 150 is located at the second heat insulation region A12 of the rotating plate 112a and is disposed between the second side 115a of the rotating plate 112a and the weight member 130. In an embodiment, the first heat insulation layer 140 and the second heat insulation layer 150 may be respectively, for example, a surface treatment layer. The surface treatment layer includes a ceramization surface layer, a micro-arc oxidation surface layer, an oxide layer, or an inorganic salt layer. In another embodiment, the first heat insulation layer 140 and the second heat insulation layer 150 may also be respectively a coated ceramic material layer, a sprayed ceramic material layer, a printed ceramic material layer, or a printed heat insulation plastic material layer.

Furthermore, a surface treatment of the rotating plate 112a may achieve functions, such as local intensified heat dissipation, local intensified heat insulation, or local improved reflection, etc., through local surface physical or chemical treatments for material properties of the rotating plate 112a, or through additional processes such as coating, spraying, or printing, etc. In this embodiment, the heat insulation region A1 of the rotating plate 112 is subjected to the surface treatment by means of a metal surface micro-arc oxidation (MAO) treatment, a metal surface ceramization treatment, a metal surface modification treatment, etc. The metal surface micro-arc oxidation (MAO) treatment is also known as a micro-plasma oxidation (MPO). In the process of the micro-arc oxidation, a metal base reacts intensely with oxygen ions and electrolyte ions under the combined action of thermochemistry, electrochemistry, and plasma chemistry. Finally, the metal base is cladding on the crystal surface and sintered to form a ceramic layer. A thermal conductivity of the ceramic layer is generally less than 10 W/mK. Compared with a general metal that has a thermal conductivity greater than 50 W/mK (for example, a thermal conductivity of aluminum is greater than 100 W/mK, while a thermal conductivity of copper is greater than 350 W/mK, and a thermal conductivity of iron is greater than 70 W/mK), the ceramic layer generated by the local micro-arc oxidation has the heat insulation effect, and the metal base without the micro-arc oxidation on the local surface may retain the characteristic of the high thermal conductivity on the surface thereof to achieve the function of local heat dissipation. For example, if a material of rotating plate 112a is aluminum, a thermal conductivity of the local rotating plate 112a may be reduced from 150 W/mK to 220 W/mK to 1 W/mK to 20 W/mK through the function of local micro-arc oxidation.

On the other hand, the process and the principle of the metal surface ceramization are similar to those of the micro-arc oxidation. The difference is that the process used in metal surface ceramization is slightly different, but the ultimate goal is to generate the ceramic layer on the local surface of the metal base to achieve the local heat insulation effect. The metal surface modification is to change a surface property of the metal material by forming an oxide film or an inorganic salt cover film through chemical or electrochemical methods. The surface property is to generate the oxide film or the inorganic salt cover layer with the low thermal conductivity, so as to achieve the local heat insulation effect. As for other regions without the surface modification, the original heat dissipation characteristic of the surface of the metal base may be retained. In addition, through the heat insulation surface treatment on the rotating plate 112a according to its material property, a porous structure is formed on a surface of the rotating plate 112a by the metal surface micro-arc oxidation (MAO) treatment or the surface ceramization treatment. Since voids in the porous structure are occupied by air, and a thermal conductivity of the air is lower than that of the metal, it is equivalent to forming the heat insulation layer on the entire ceramization surface. Alternatively, the surface of the rotating plate 112a is treated by other surface modification treatments, for example, the formation of the inorganic salt cover film, etc. Although the porous structure is not necessarily formed on the surface of the rotating plate 112a, the cover film itself has the lower thermal conductivity. Therefore, it is equivalent to the effect of the heat insulation layer.

Compared with the prior art of adding a functional element (for example, a heat dissipation fin is disposed on the rotating plate) to achieve the heat dissipation effect or the heat insulation effect, in this embodiment, the surface treatment is adopted for the rotating plate 112a to directly treat the surface of the rotating plate 112a. Therefore, compared with the prior art, the number of the elements in this embodiment may not be increased, so that the entire thickness may not significantly changed, and the elements are compatible with other existing elements. Therefore, the elements have a positive benefit to the service life and the reliability of the wavelength conversion module 100a of this embodiment.

In addition, referring to FIGS. 2C and 2D again, the wavelength conversion wheel 100a of this embodiment further includes a first adhesive layer 160 and a second adhesive layer 165. The first adhesive layer 160 is disposed between the first side 113a of the rotating plate 112a and the driver 120. The driver 120 is fixed on the rotating plate 112a through the first adhesive layer 160. The second adhesive layer 165 is disposed between the second side 115a of the rotating plate 112a and the weight member 130. The weight member 130 is fixed on the rotating plate 112a through the second adhesive layer 165.

In brief, the rotating plate 112a of this embodiment includes the heat insulation region A1 and the heat dissipation region A2, and the heat insulation region A1 and the heat dissipation region A2 do not overlap each other. That is, at least two regions with different functional properties of heat insulation and heat dissipation may be disposed on the rotating plate 112a according to the requirements, so as to achieve the heat dissipation effect and heat insulation effect at the same time on the rotating plate. Furthermore, the heat insulation region A1 includes the first heat insulation region A11 located at the first side 113a of the rotating plate 112a and corresponding to the connection position of the driver 120, and the second heat insulation region A12 located at the second side 115a of the rotating plate 112a and corresponding to the connection position of the weight member 130. In this way, heat energy from the wavelength conversion layer 114 may be effectively blocked from being transferred to the driver 120 and the weight member 130, so as to prevent a filler (not shown) on the weight member 130 and an element of the driver 120 from being degraded and the service life from being shortened due to the heat, which may improve the reliability of the wavelength conversion module 100a of this embodiment. In addition, the projector adopting the wavelength conversion module of the embodiment may have a higher reliability and a longer service life, thereby enhancing the product competitiveness.

Here, it should be noted that reference numerals and a part of the content of the foregoing embodiments are used in the following embodiments. The same reference numerals are used to represent the same or similar elements, and the description of the same technical content is omitted. The description of the omitted parts may refer to the foregoing embodiments, and the same details will not be repeated in the following embodiments.

Figure 3A:
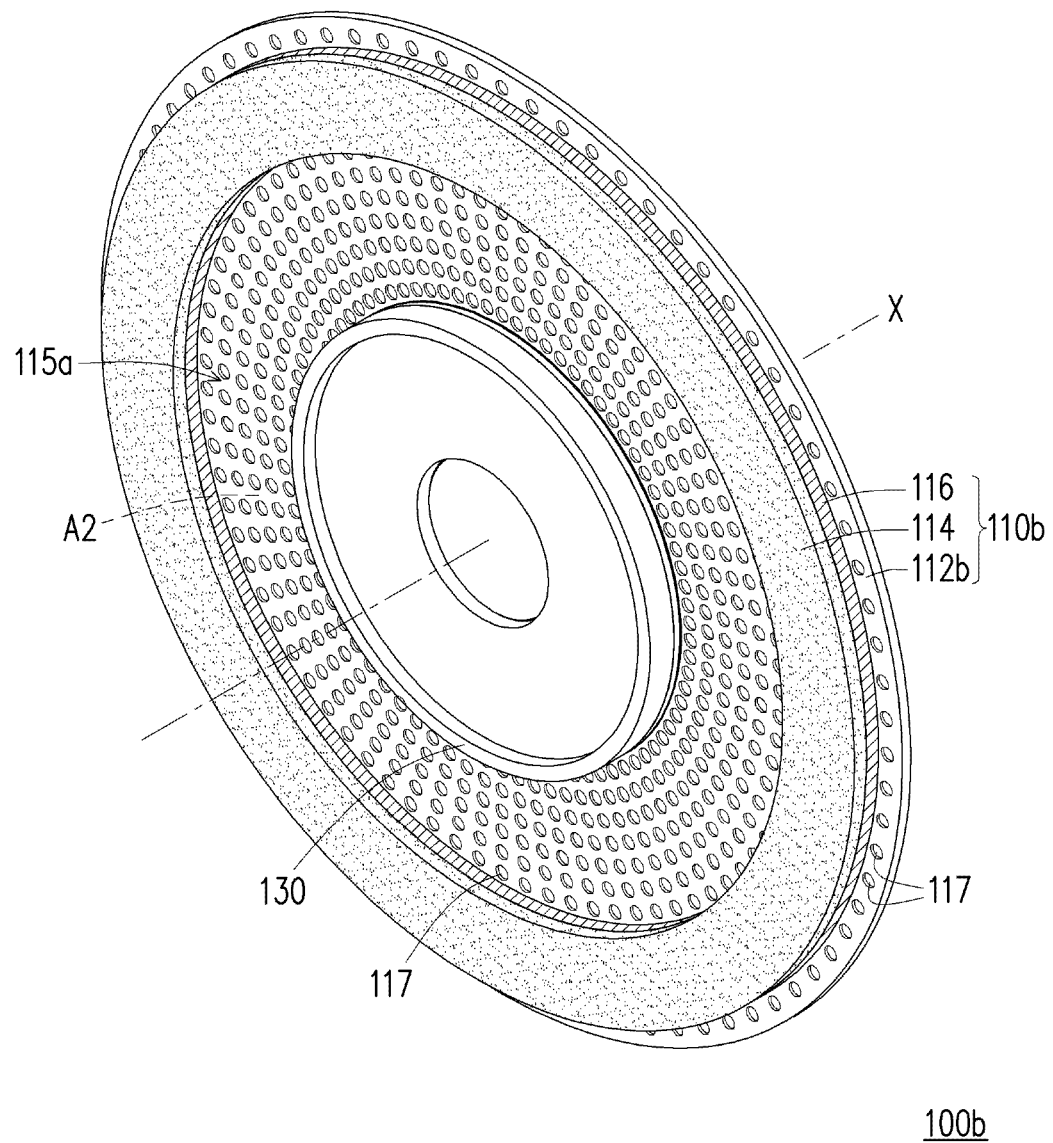
FIGS. 3A and 3B are schematic perspective views of a wavelength conversion module in different viewing angles according to an embodiment of the disclosure.
Figure 3B:
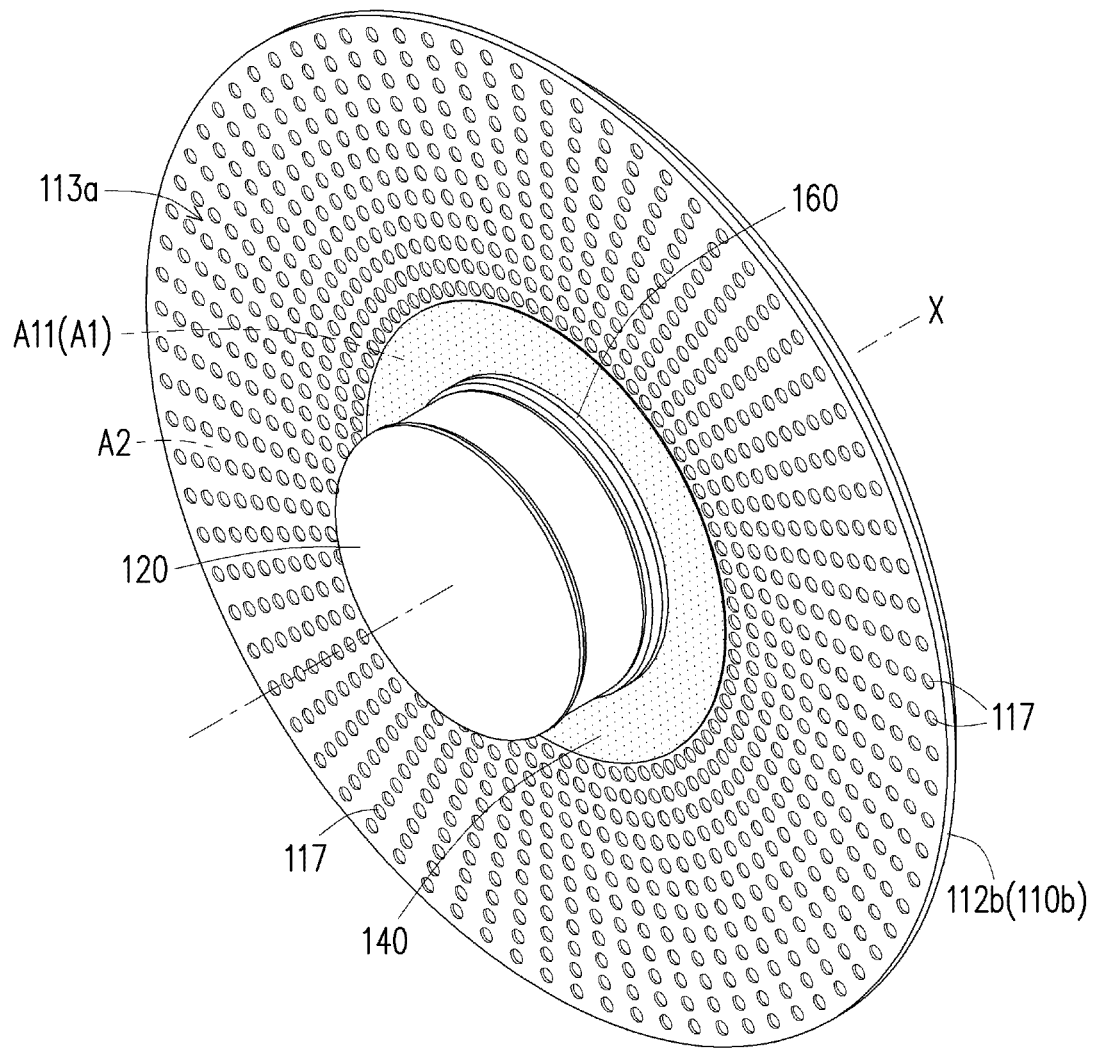

FIGS. 3A and 3B are schematic perspective views of a wavelength conversion module in different viewing angles according to an embodiment of the disclosure. Referring to FIGS. 2A, 2B, 3A, and 3B, a wavelength conversion module 100b of this embodiment is similar to the wavelength conversion module 100a of FIGS. 2A and 2B. The difference between the two embodiments is that, in this embodiment, a rotating plate 112b of a wavelength conversion wheel 110b further includes multiple disturbing portions 117 located in the heat dissipation region A2. The disturbing portions 117 correspond to a surface of the heat dissipation region A2 and are recessed in the rotating plate 112b. In other words, in this embodiment, a surface area is increased through the disturbing portions 117, so as to improve the heat dissipation effect of the heat dissipation region A2 of the rotating plate 112b. In addition, the disturbing portions 117 may be uniformly disposed in the heat dissipation region A2 or unevenly disposed in the heat dissipation region A2, and the disclosure does not limit the disposition density. In other embodiments, the disturbing portions corresponding to the surface of the heat dissipation region may also protrude from the rotating plate. Here, as long as the function of the disturbing portions may be achieved, the embodiment does not limit whether the disturbing portions are recessed in or protrude from the rotating plate.

Figure 4A:
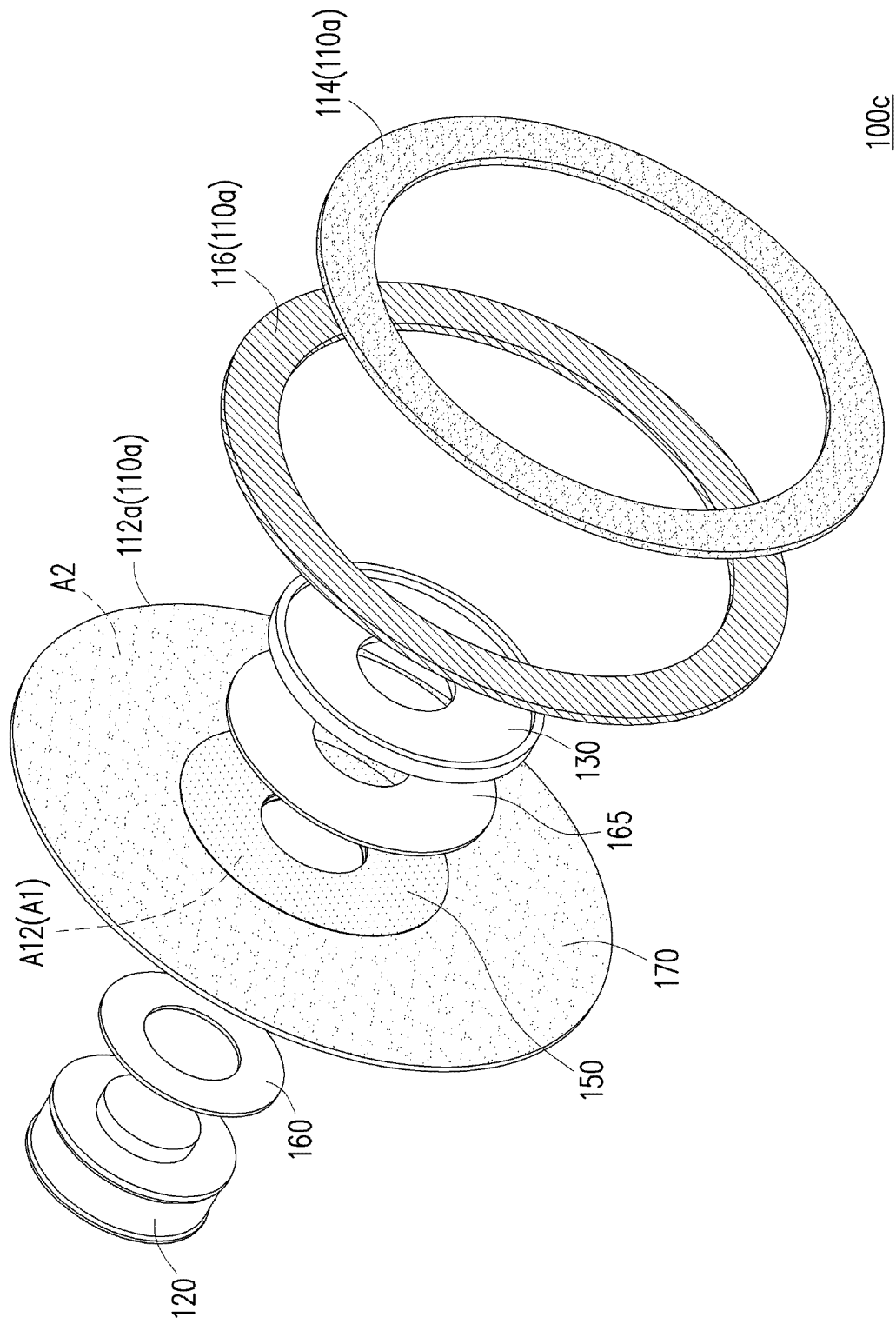
FIGS. 4A and 4B are schematic perspective exploded views of a wavelength conversion module in different viewing angles according to an embodiment of the disclosure.
Figure 4B:
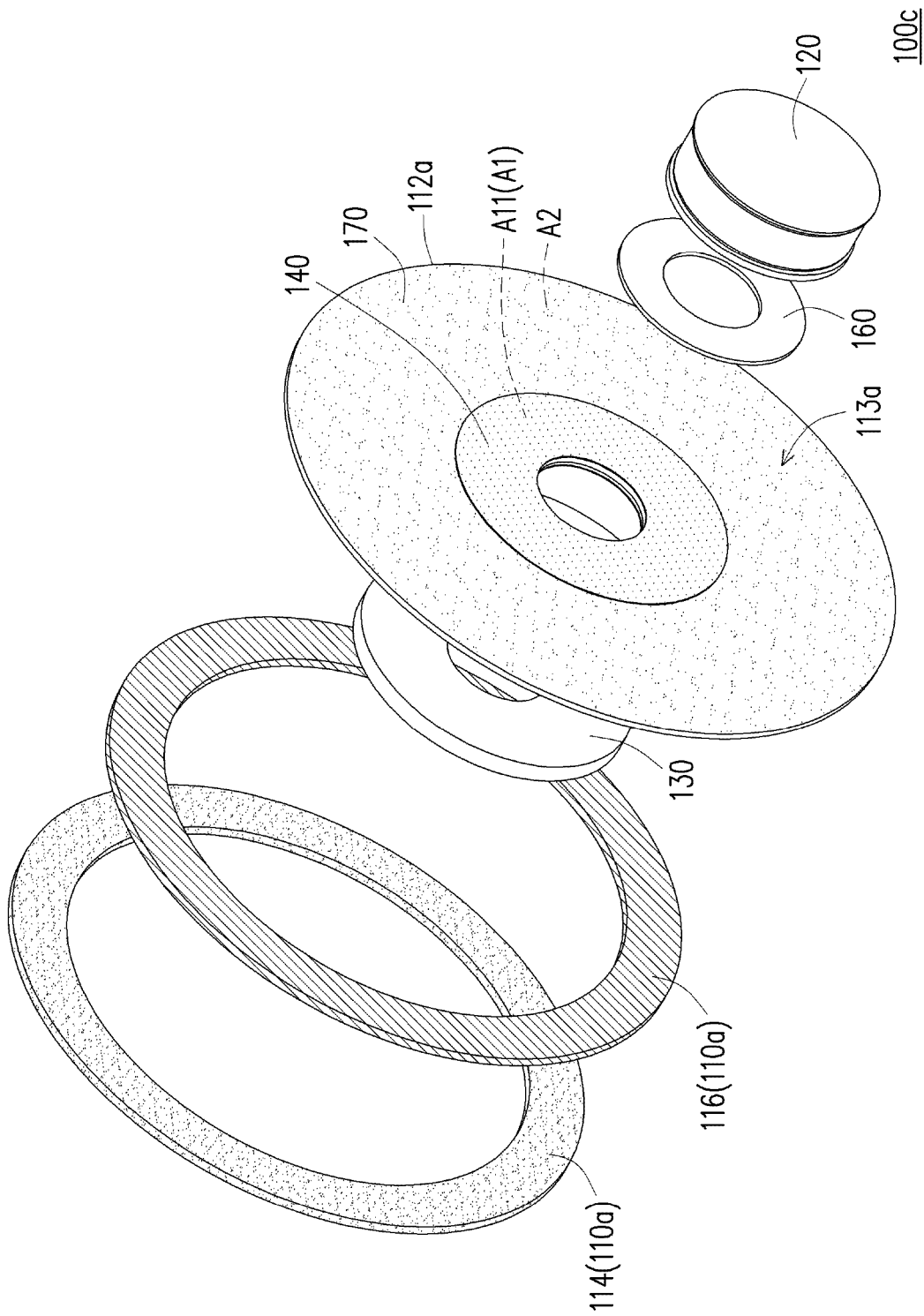

FIGS. 4A and 4B are schematic perspective exploded views of a wavelength conversion module in different viewing angles according to an embodiment of the disclosure. Referring to FIGS. 2A, 2B, 4A, and 4B, a wavelength conversion module 100c of this embodiment is similar to the wavelength conversion module 100a of FIGS. 2A and 2B. The difference between the two embodiments is that, in this embodiment, the wavelength conversion module 100c further includes a heat dissipation layer 170. The heat dissipation layer 170 is disposed on the rotating plate 112a and is located at the heat dissipation region A2. Preferably, the heat dissipation layer 170 is a material having a high thermal conductivity. Here, the heat dissipation layer 170 may be formed by coating a high thermal conductivity material. The high thermal conductivity material is, for example, graphite, diamond, silver, copper, or aluminum, etc. In other words, in this embodiment, the heat dissipation layer 170 is coated on the rotating plate 112a, so as to improve the heat dissipation effect of the heat dissipation region A2 of the rotating plate 112a.

Figure 5A:
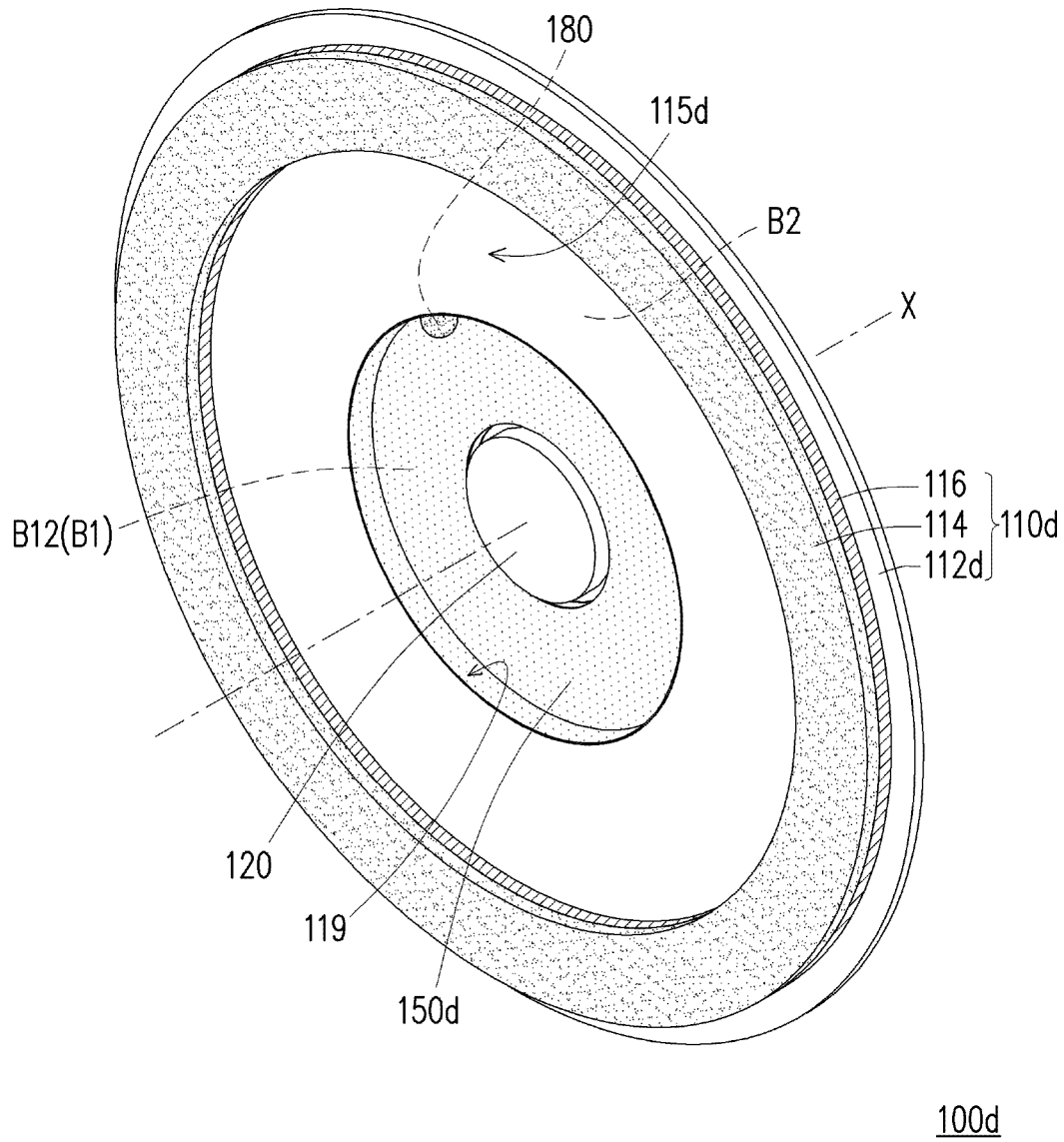
FIGS. 5A and 5B are schematic perspective views of a wavelength conversion module in different viewing angles according to an embodiment of the disclosure.
Figure 5B:
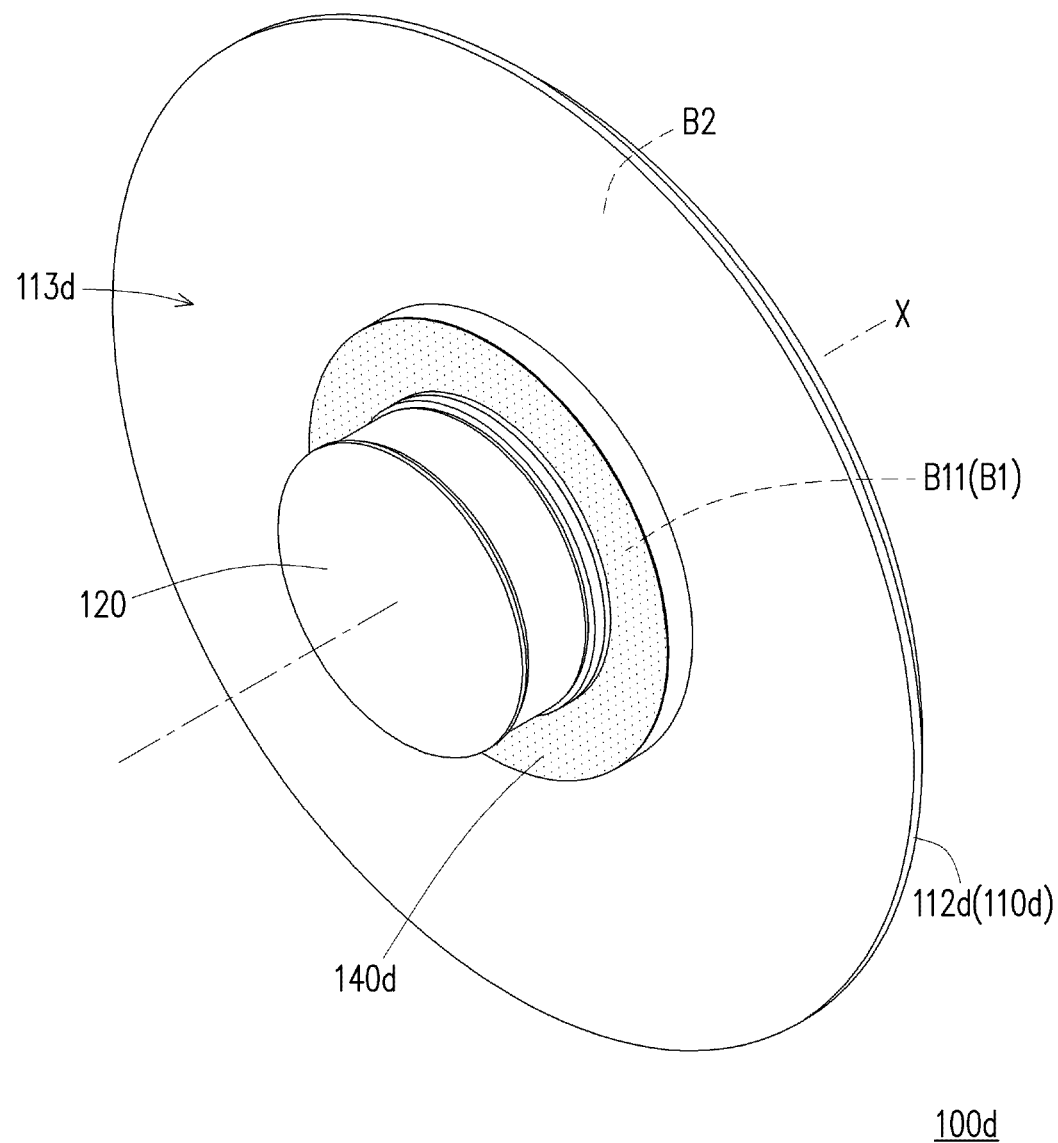
Figure 5C:
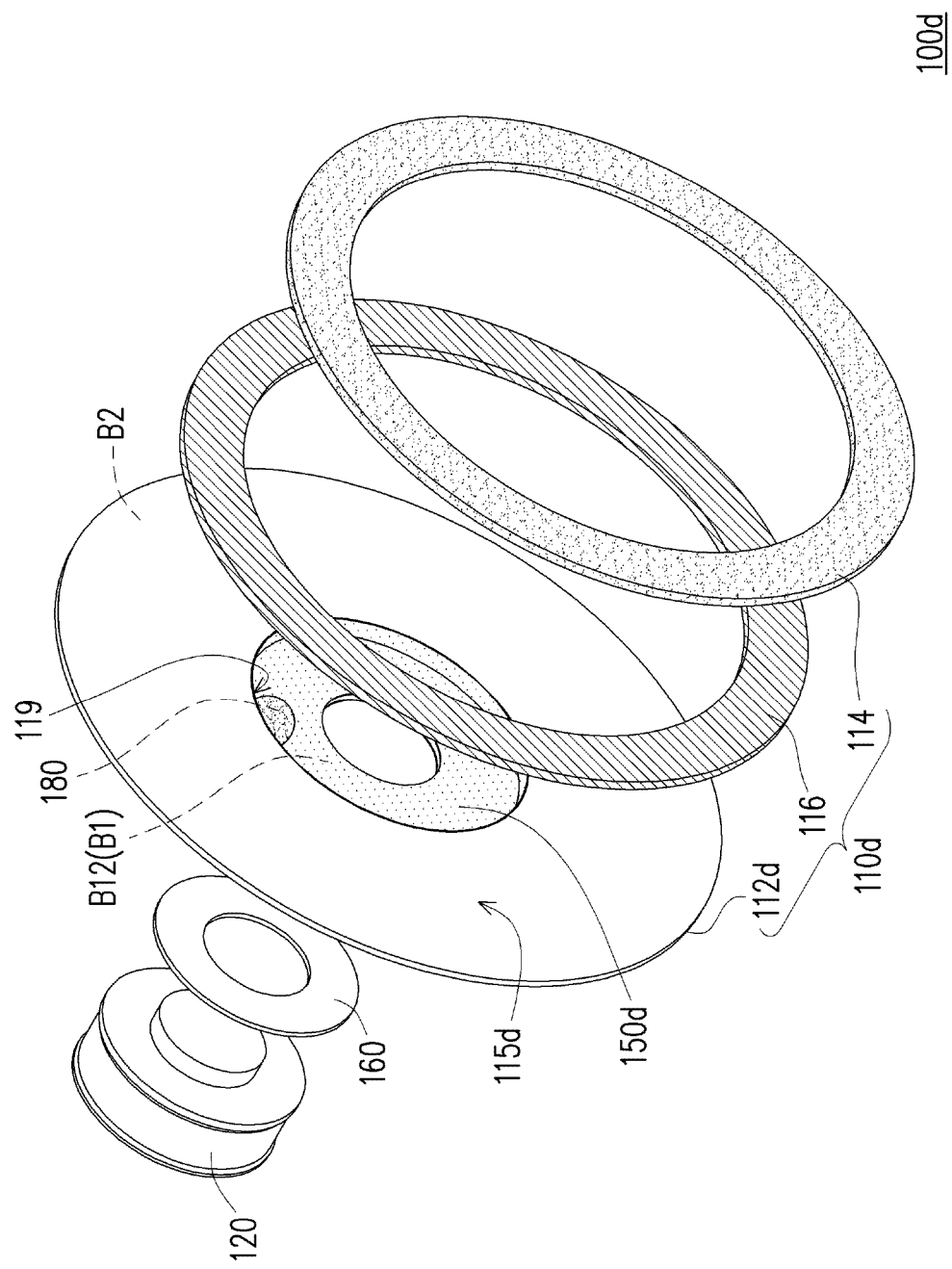
FIGS. 5C and 5D are respectively schematic perspective exploded views of the wavelength conversion module of FIGS. 5A and 5B.
Figure 5D:
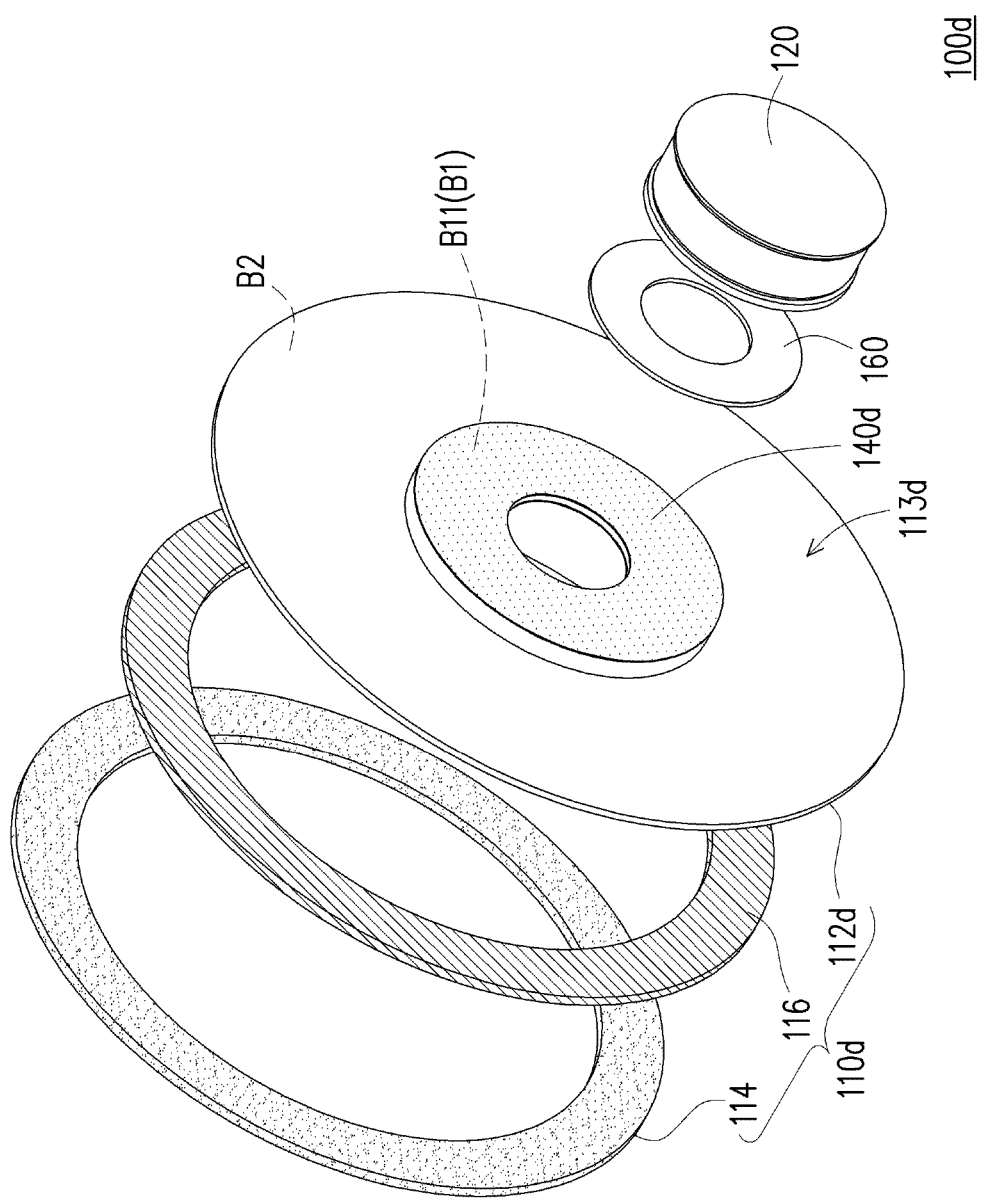
Figure 5E:
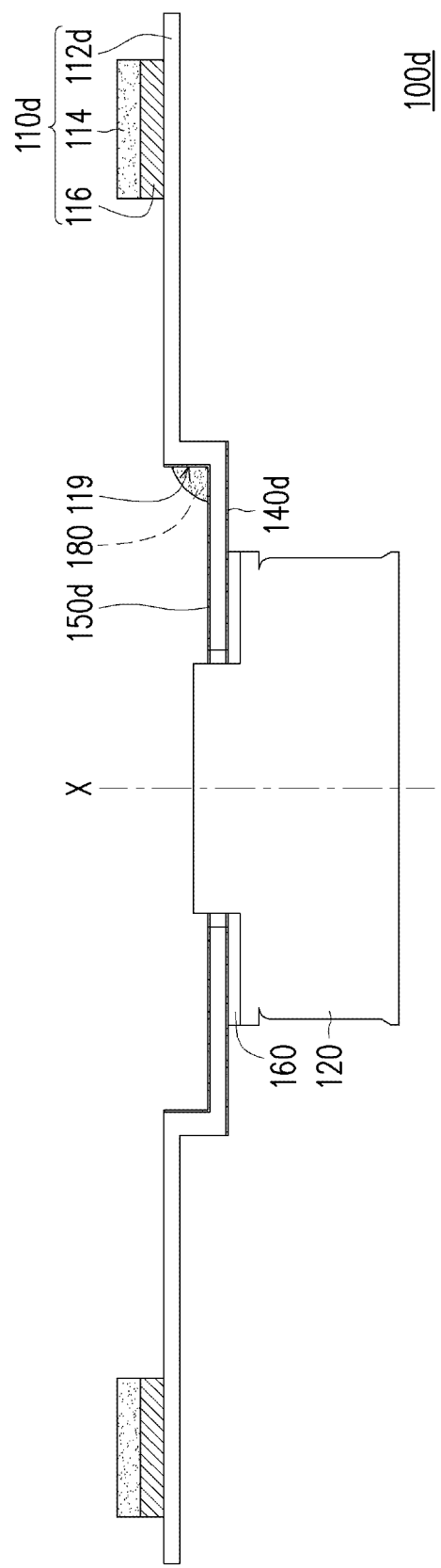
FIG. 5E is a schematic cross-sectional view of the wavelength conversion module of FIG. 5A.

FIGS. 5A and 5B are schematic perspective views of a wavelength conversion module in different viewing angles according to an embodiment of the disclosure. FIGS. 5C and 5D are respectively schematic perspective exploded views of the wavelength conversion module of FIGS. 5A and 5B. FIG. 5E is a schematic cross-sectional view of the wavelength conversion module of FIG. 5A.

Referring to FIGS. 5A, 5B, and 5E, a wavelength conversion module 100d of this embodiment includes a wavelength conversion wheel 110d and a driver 120. In detail, referring to FIGS. 5C and 5D, the wavelength conversion wheel 110d includes a rotating plate 112d. The rotating plate 112d has a first side 113d and a second side 115d opposite to each other, and the rotating plate 112d includes an annular recess hole 119 that is recessed from the second side 115d toward the first side 113d. The driver 120 is connected to the first side 113d of the rotating plate 112d, and the driver 120 may drive the rotating plate 112d to rotate around a rotation shaft X of the driver 120 as an axis. In particular, the rotating plate 112d includes a heat insulation region B1 and a heat dissipation region B2. The heat insulation region B1 and the heat dissipation region B2 do not overlap each other. In addition, the heat insulation region B1 further includes a first heat insulation region B11 and a second heat insulation region B12. The first heat insulation region B11 is located at the first side 113d of the rotating plate 112d and corresponds to a connection position of the driver 120, while the second heat insulation region B12 corresponds to a position of the annular recess hole 119.

Referring to both FIGS. 5A and 5C again, a wavelength conversion wheel 110d of this embodiment further includes a wavelength conversion layer 114 and a reflection layer 116. The wavelength conversion layer 114 is disposed at the second side 115d of the rotating plate 112d, and the reflection layer 116 is disposed at the second side 115d of the rotating plate 112d. The wavelength conversion layer 114 and the reflection layer 116 are both located at the heat dissipation region B2, and the reflection layer 116 is located between the rotating plate 112d and the wavelength conversion layer 114. That is, the reflection layer 116 is first disposed at the heat dissipation region B2 of the rotating plate 112d, and the wavelength conversion layer 114 is disposed on the reflection layer 116. Here, the wavelength conversion layer 114 is, for example, a phosphor layer, which is configured to convert the wavelength of the exciting beam L' in FIG. 1 and to generate the conversion beams L" having different wavelengths. In other words, the projector 10 in FIG. 1 may also adopt the wavelength conversion module 100d of this embodiment. Referring to FIGS. 2A, 2C, and 2E optionally, the wavelength conversion module 100d further includes a filler 180 disposed in the annular recess hole 119 of the rotating plate 112d, so as to correct the balance when the wavelength conversion module 100d is rotated.

In addition, referring to FIGS. 5A and 5B, the wavelength conversion wheel 110d of this embodiment further includes a first heat insulation layer 140d and a second heat insulation layer 150d. As shown in FIG. 5D, the first heat insulation layer 140d is located at the first heat insulation region B11 of the rotating plate 112d and is disposed between the first side 113d of the rotating plate 112d and the driver 120. As shown in FIG. 5C, the second heat insulation layer 150d is located at the second heat insulation region B12 of the rotating plate 112d and is disposed at the second side 115d of the rotating plate 112d. In an embodiment, the first heat insulation layer 140d and the second heat insulation layer 150d may be respectively, for example, a surface treatment layer. The surface treatment layer includes a ceramization surface layer, a micro-arc oxidation surface layer, an oxide layer, or an inorganic salt layer. In another embodiment, the first heat insulation layer 140d and the second heat insulation layer 150d may also be respectively a coated ceramic material layer, a sprayed ceramic material layer, a printed ceramic material layer, or a printed heat insulation plastic material layer.

In brief, the wavelength conversion module 100d of this embodiment is not provided with the weight member 130 in FIG. 2A, but the weight member 130 is replaced by the annular recess hole 119 integrally formed with the rotating plate 112d. It is also possible to correct the balance of the wavelength conversion module 100d when the wavelength conversion module 100d is rotated by disposing the filler 180 in the annular recess hole 119 of the rotating plate 112d. In this way, the cost of the wavelength conversion module 100d may be reduced, so that the structure of the wavelength conversion module 100d is simplified. The vibration and the noise generated during the operation of the wavelength conversion module 100d may also be avoided, which may improve the reliability and the service life of the wavelength conversion module 100d.

Figure 6:
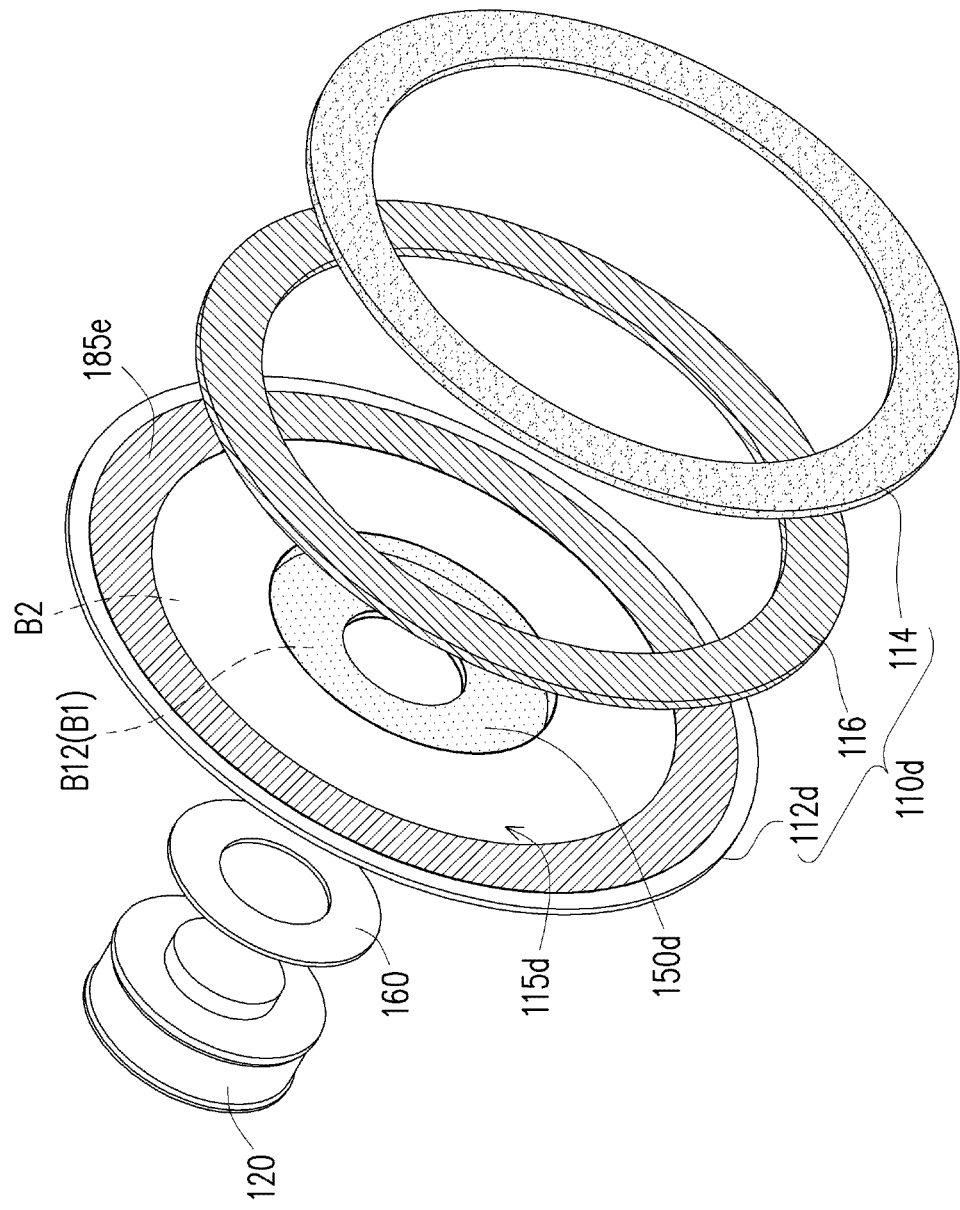
FIG. 6 is a schematic perspective exploded view of a wavelength conversion module according to an embodiment of the disclosure.

FIG. 6 is a schematic perspective exploded view of a wavelength conversion module according to an embodiment of the disclosure. Referring to both FIGS. 5C and 6, a wavelength conversion module 100e of this embodiment is similar to the wavelength conversion module 100d of FIG. 5C. The difference between the two embodiments is that, in this embodiment, the wavelength conversion module 100e further includes an auxiliary reflection layer 185e. The auxiliary reflection layer 185e is disposed between the reflection layer 116 and the rotating plate 112d, and is located at the heat dissipation region B2. Preferably, the auxiliary reflection layer 185e is, for example, a surface treatment reflection layer, a coated reflection layer, a sprayed reflection layer, or a printed reflection layer, which may improve a reflectivity of the wavelength conversion module 100e.

Figure 7A:
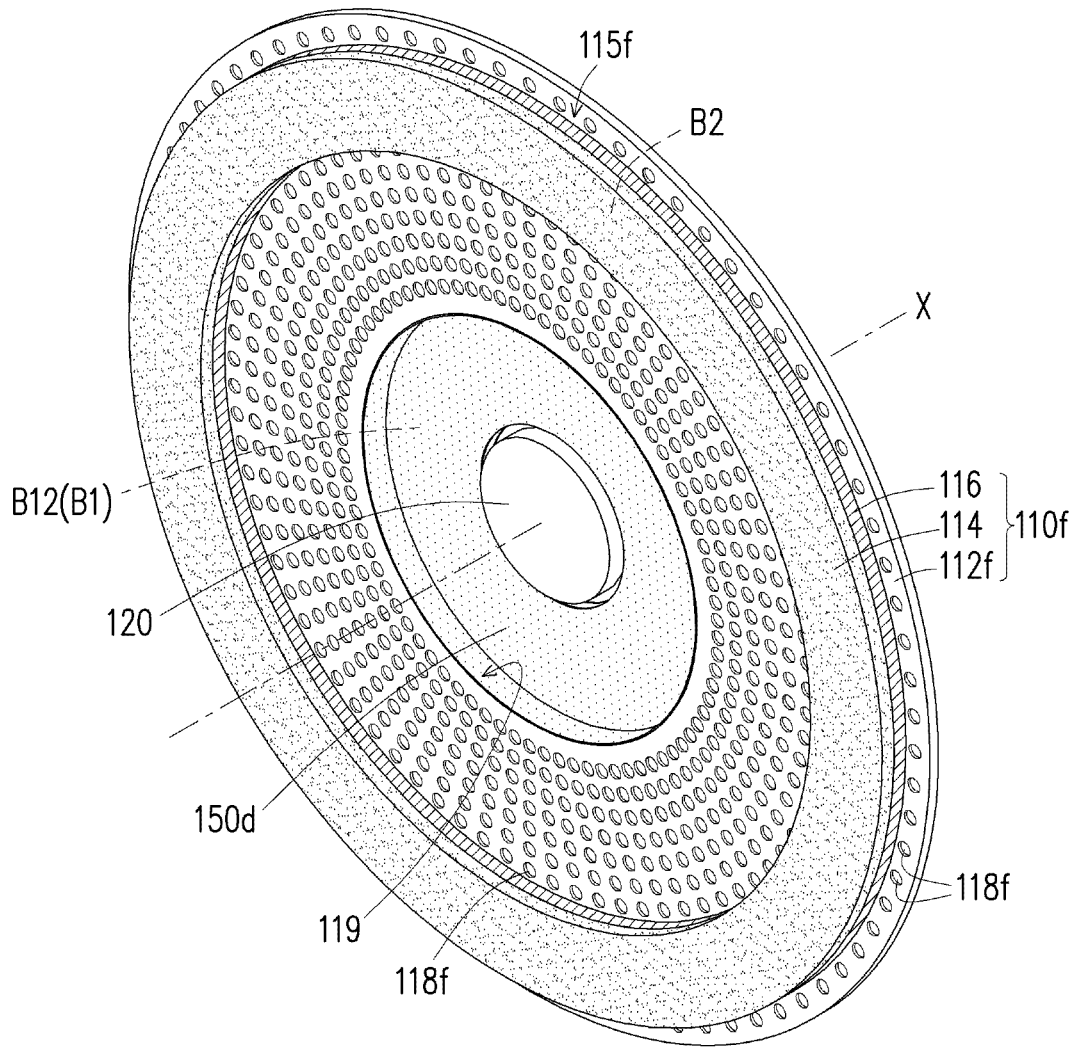
FIGS. 7A and 7B are schematic perspective views of a wavelength conversion module in different viewing angles according to an embodiment of the disclosure.
Figure 7B:
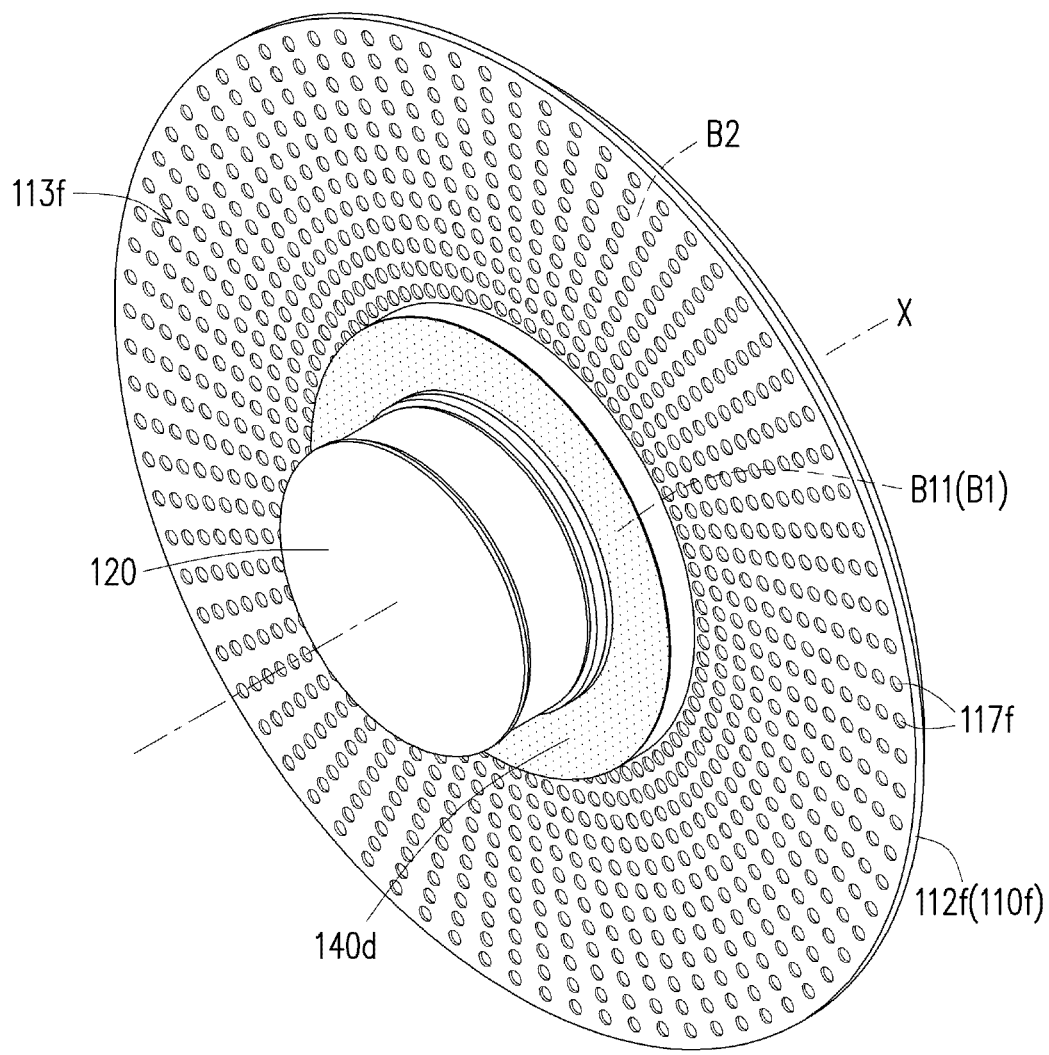
Figure 7C:
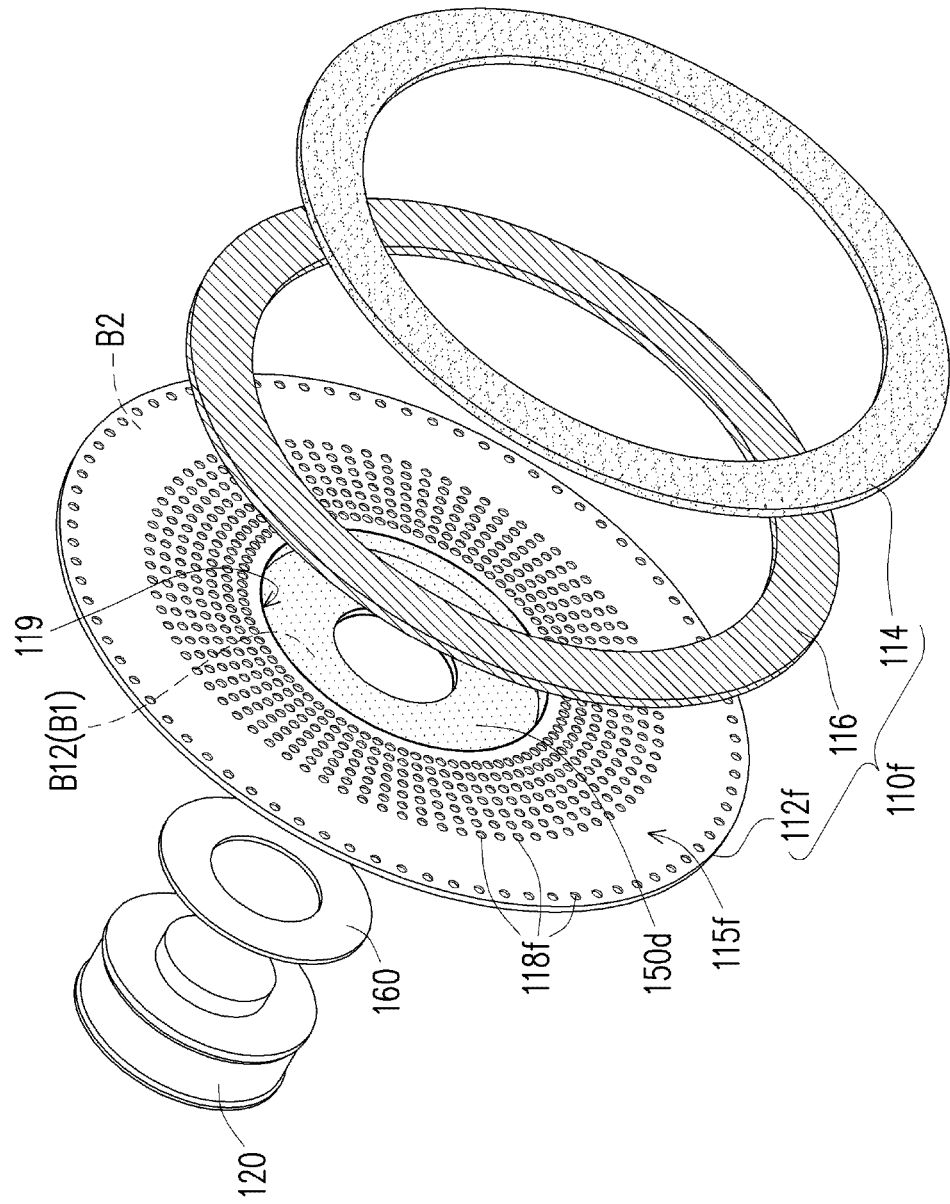
FIGS. 7C and 7D are respectively schematic perspective exploded views of the wavelength conversion module of FIGS. 7A and 7B.
Figure 7D:
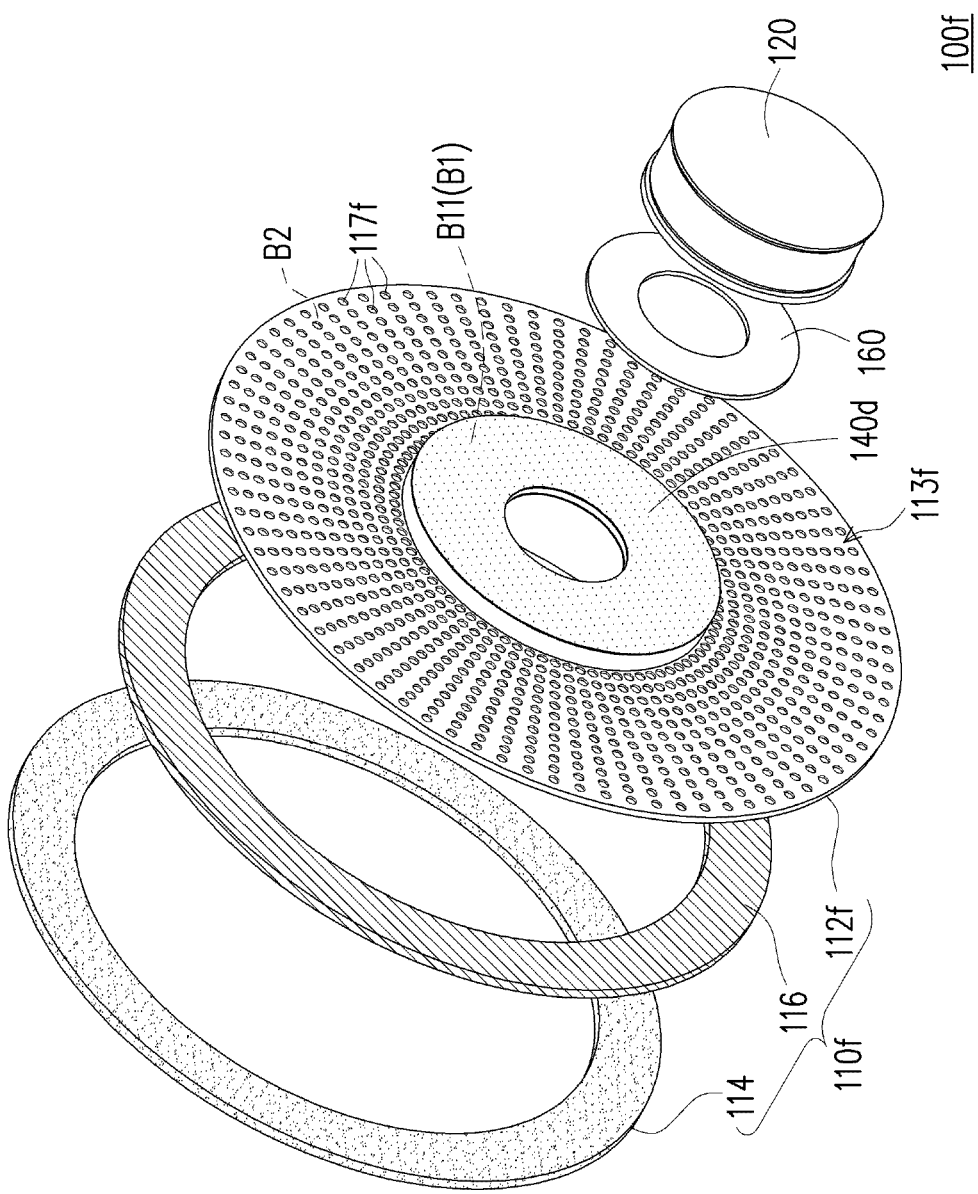
Figure 7E:
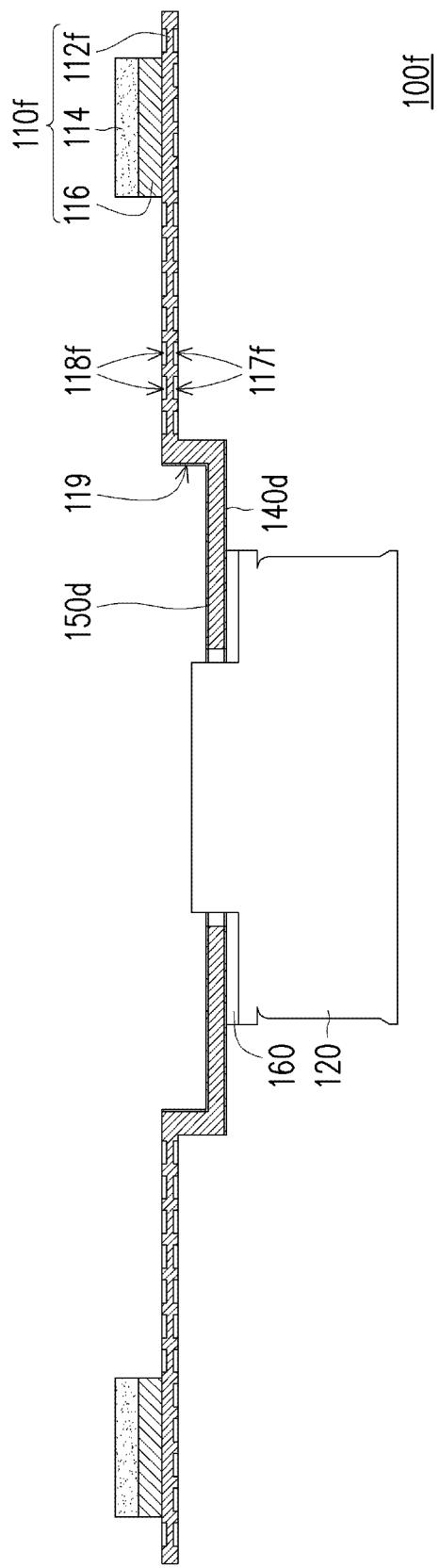
FIG. 7E is a schematic cross-sectional view of the wavelength conversion module of FIG. 7A.

FIGS. 7A and 7B are schematic perspective views of a wavelength conversion module in different viewing angles according to an embodiment of the disclosure. FIG. 7C and FIG. 7D are respectively schematic perspective exploded views of the wavelength conversion module of FIGS. 7A and 7B. FIG. 7E is a schematic cross-sectional view of the wavelength conversion module of FIG. 7A. Referring to FIGS. 5A, 5B, 7A, 7B, and 7E, a wavelength conversion module 100f of this embodiment is similar to the wavelength conversion module 100d of FIGS. 5A and 5B. The difference between the two embodiments is that, in this embodiment, a rotating plate 112f of a wavelength conversion wheel 110f further includes multiple first disturbing portions 117f and multiple second disturbing portions 118f. In detail, as shown in FIGS. 7B and 7D, the first disturbing portions 117f are disposed at a first side 113f of the rotating plate 112f, and are located in the heat dissipation region B2. The first disturbing portions 117f are recessed in a surface of the first side 113f. As shown in FIGS. 7A and 7C, the second disturbing portions 118f are disposed at a second side 115f of the rotating plate 112f, and are located in the heat dissipation region B2 outside the reflection layer 116. The second disturbing portions 118f are recessed in a surface of the second side 115f. In other words, in this embodiment, the surface area is increased through the first disturbing portions 117f and the second disturbing portions 118f, so as to improve the heat dissipation effect of the heat dissipation region B2 of the rotating plate 112f.

Figure 8:
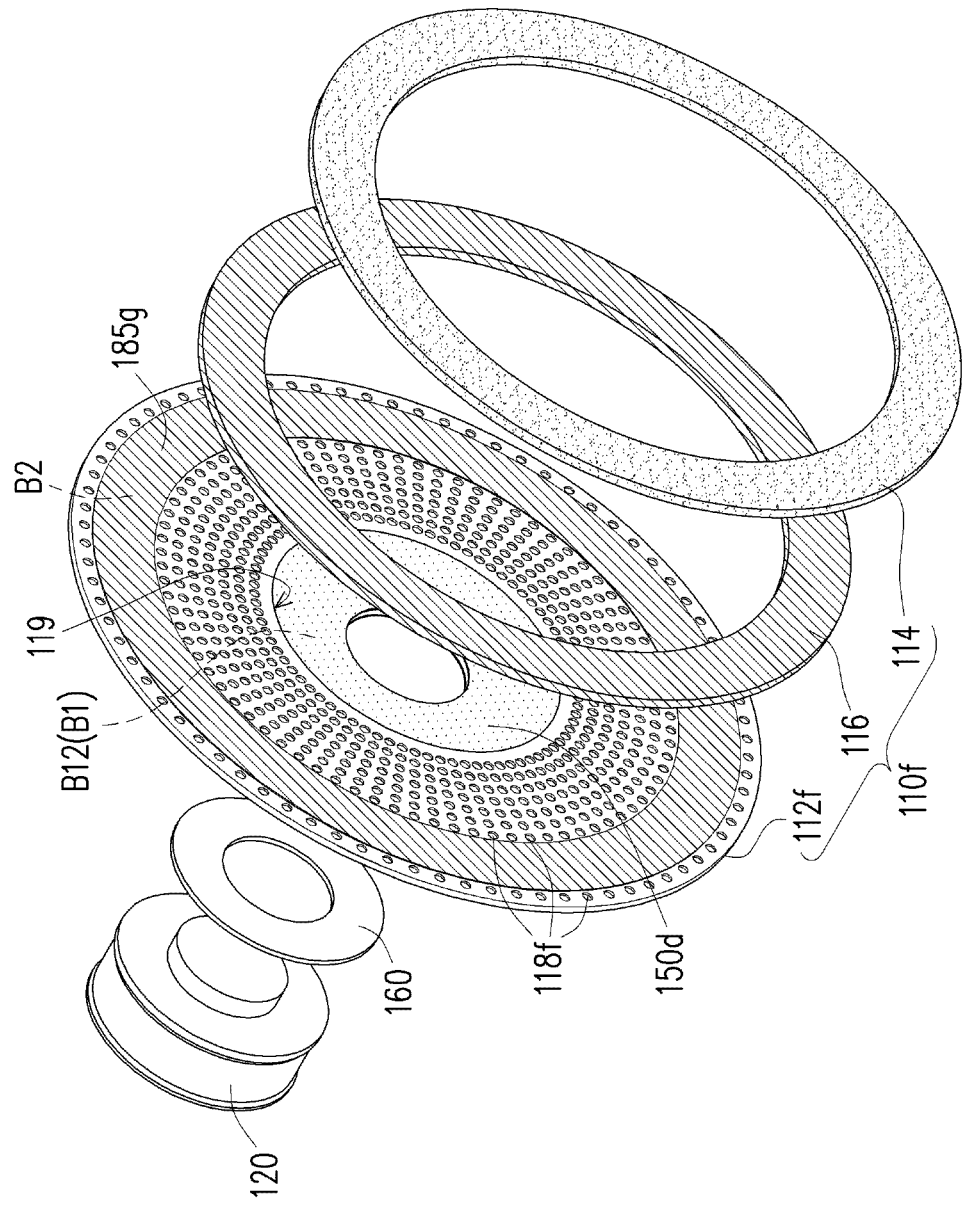
FIG. 8 is a schematic perspective exploded view of a wavelength conversion module according to an embodiment of the disclosure.

FIG. 8 is a schematic perspective exploded view of a wavelength conversion module according to an embodiment of the disclosure. Referring to both FIGS. 7C and 8, a wavelength conversion module 100g of this embodiment is similar to the wavelength conversion module 100f of FIG. 7C. The difference between the two embodiments is that, in this embodiment, the wavelength conversion module 100g further includes an auxiliary reflection layer 185g. The auxiliary reflection layer 185g is disposed between the reflection layer 116 and the rotating plate 112f, and is located at the heat dissipation region B2. Preferably, the auxiliary reflection layer 185g is, for example, a surface treatment reflection layer, a coated reflection layer, a sprayed reflection layer, or a printed reflection layer, which may improve a reflectivity of the wavelength conversion module 100g.

Figure 9:
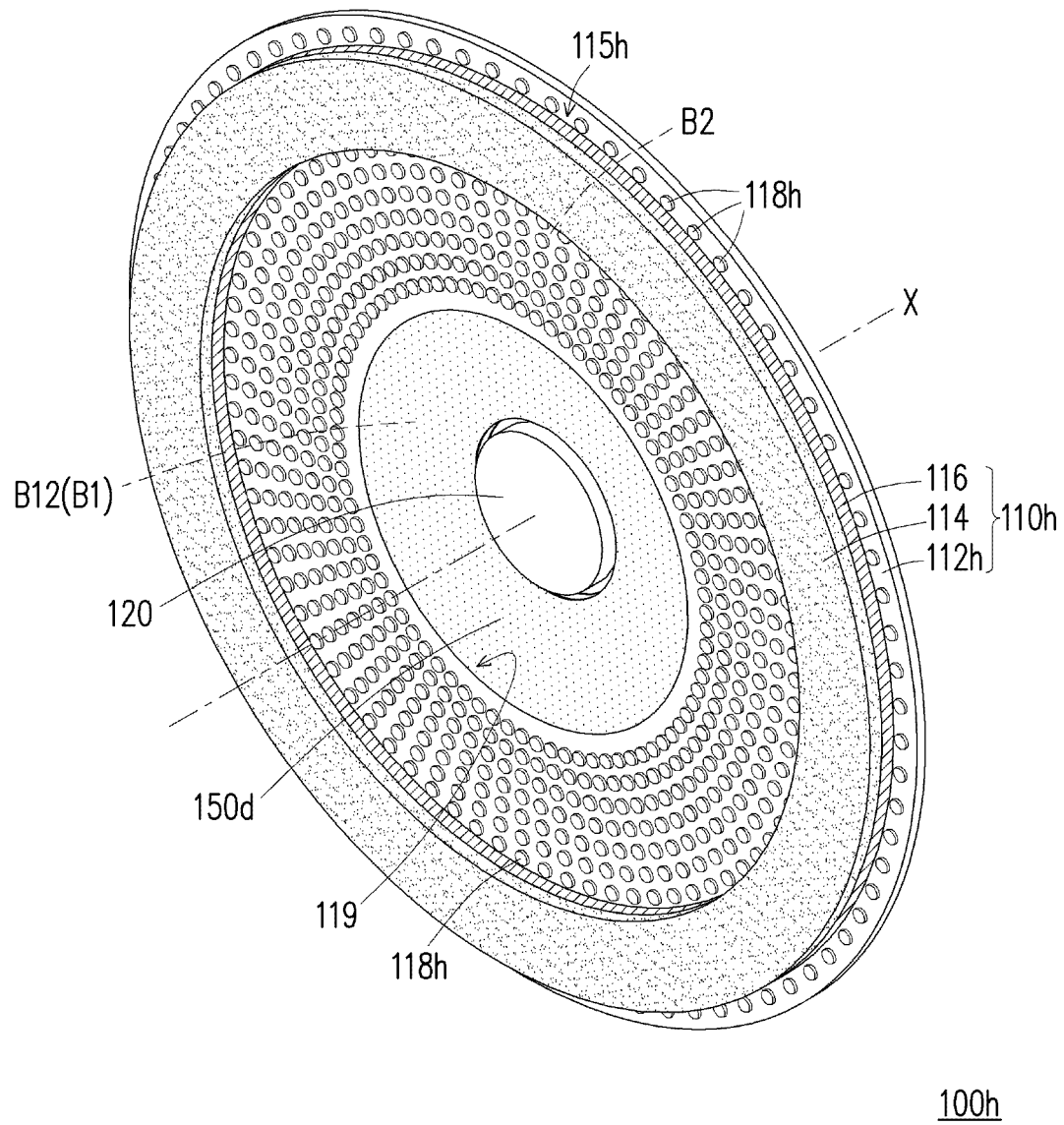
FIG. 9 is a schematic perspective view of a wavelength conversion module according to an embodiment of the disclosure.

FIG. 9 is a schematic perspective view of a wavelength conversion module according to an embodiment of the disclosure. Referring to both FIGS. 7A and 9, a wavelength conversion module 100h of this embodiment is similar to the wavelength conversion module 100f of FIG. 7A. The difference between the two embodiments is that, in this embodiment, multiple second disturbing portions 118h are disposed at a second side 115h of a rotating plate 112h of a wavelength conversion wheel 110h, and are located in the heat dissipation region B2 outside the reflection layer 116. The second disturbing portions 118h protrude from a surface of the second side 115h of the rotating plate 112h.

Figure 10A:
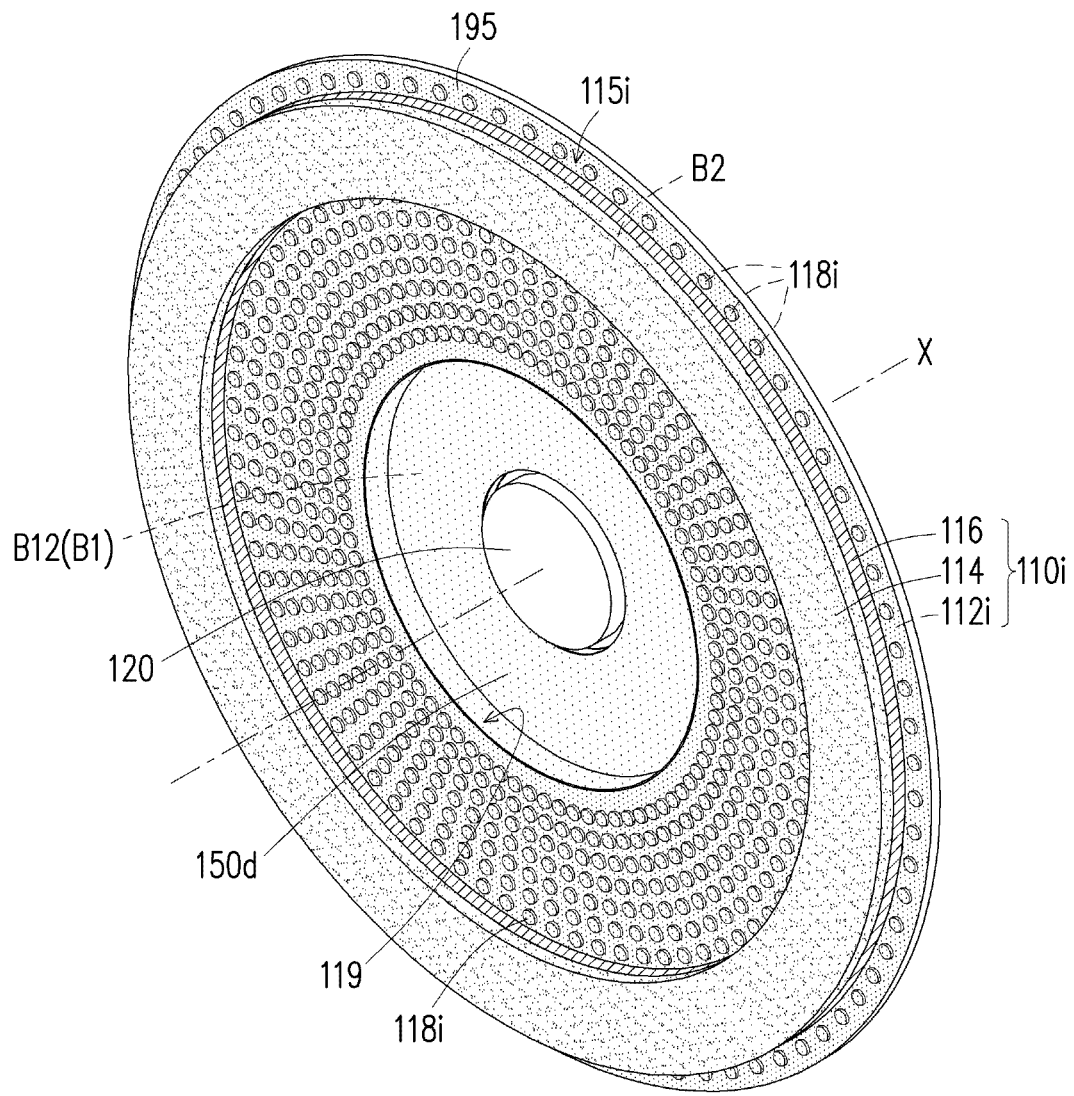
FIGS. 10A and 10B are schematic perspective views of a wavelength conversion module in different viewing angles according to an embodiment of the disclosure.
Figure 10B:
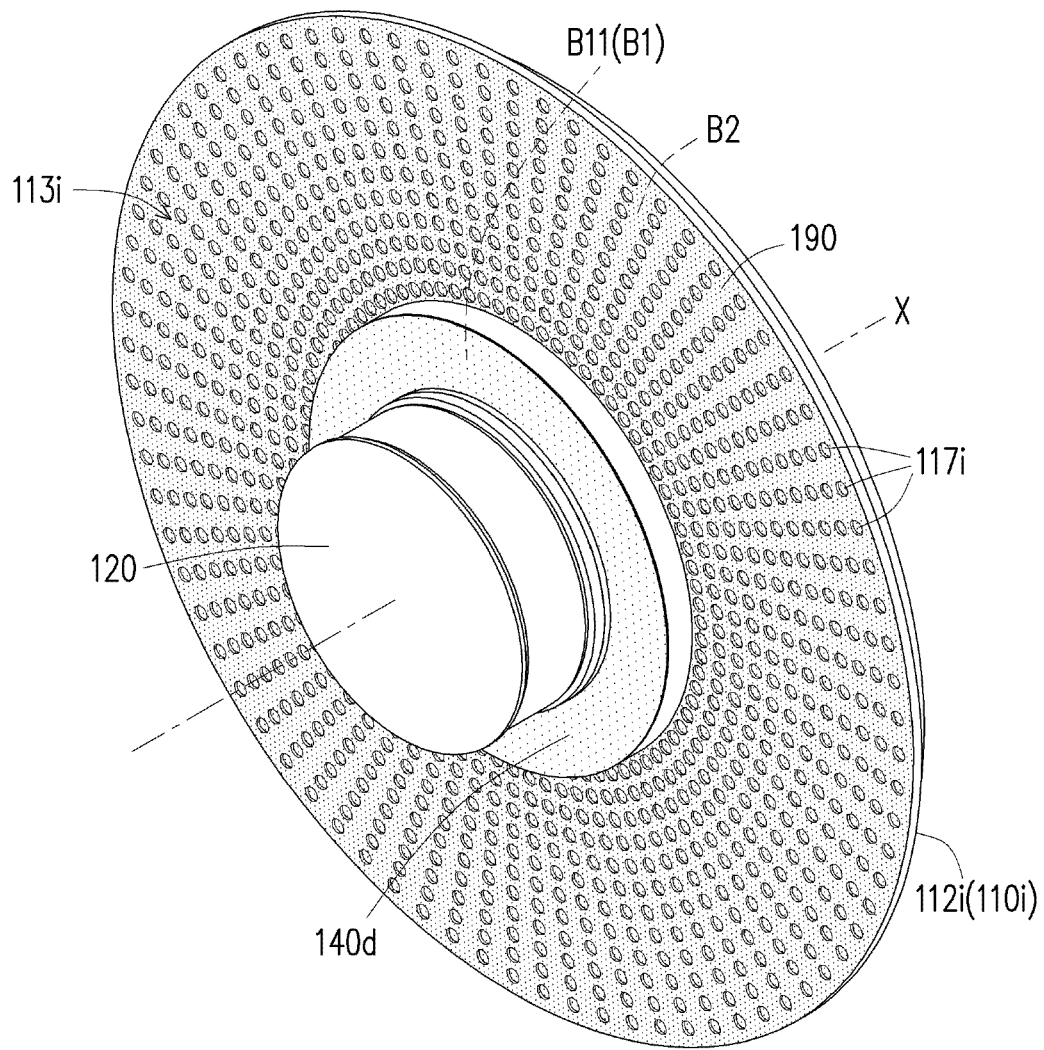
Figure 10C:
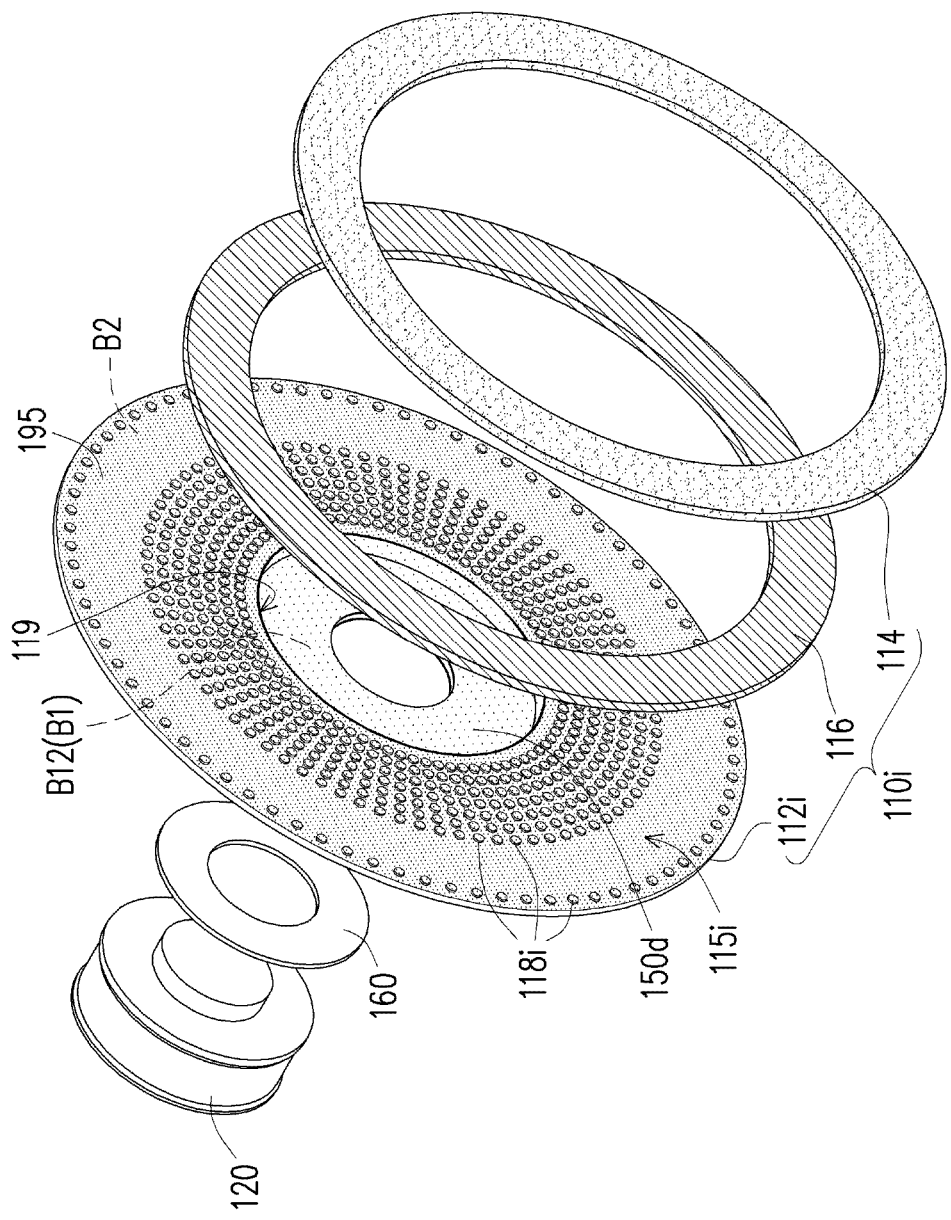
FIGS. 10C and 10D are respectively schematic perspective exploded views of the wavelength conversion module of FIGS. 10A and 10B.
Figure 10D:
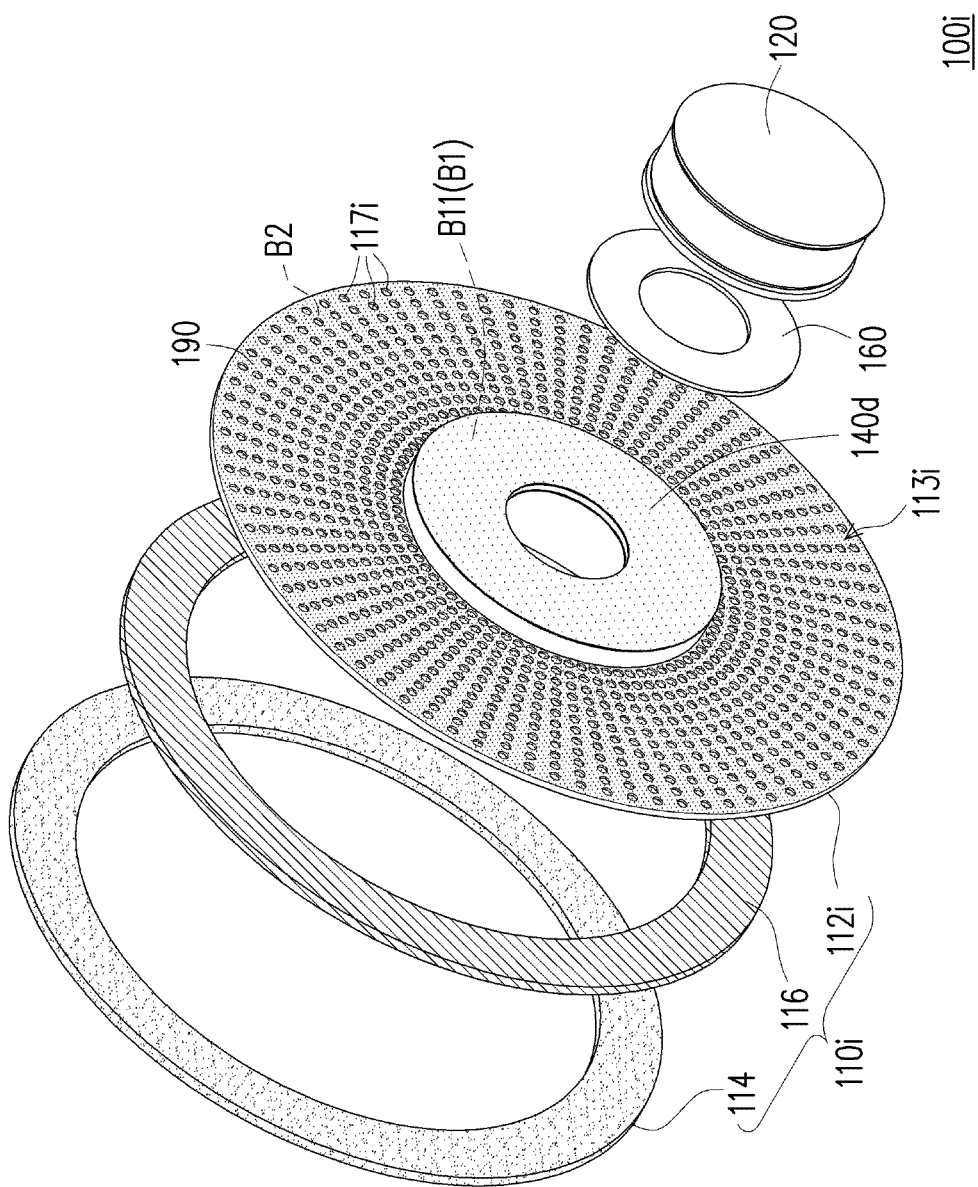
Figure 10E:
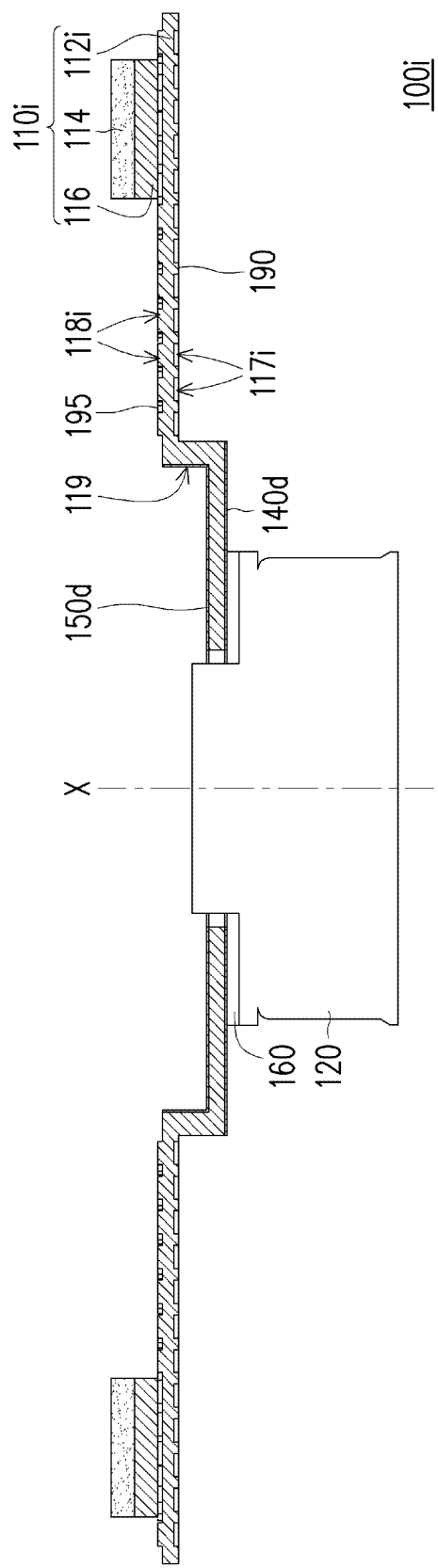
FIG. 10E is a schematic cross-sectional view of the wavelength conversion module of FIG. 10A.

FIGS. 10A and 10B are schematic perspective views of a wavelength conversion module in different viewing angles according to an embodiment of the disclosure. FIGS. 10C and 10D are respectively schematic perspective exploded views of the wavelength conversion module of FIGS. 10A and 10B. FIG. 10E is a schematic cross-sectional view of the wavelength conversion module of FIG. 10A. Referring to FIGS. 7A, 7B, 10A, 10B, and 10E, a wavelength conversion module 100i of this embodiment is similar to the wavelength conversion module 100f of FIGS. 7A and 7B. The difference between the two embodiments is that, in this embodiment, the wavelength conversion module 100i further includes a first coating layer 190 and a second coating layer 195. In detail, referring to both FIGS. 10B and 10D, the first coating layer 190 is disposed on a surface of a first side 113i of a rotating plate 112i and covers multiple first disturbing portions 117i. Referring to both FIGS. 10A and 10C, the second coating layer 195 is disposed on a surface of a second side 115i of the rotating plate 112i and covers multiple second disturbing portions 118i. Here, the first disturbing portions 117*i* are recessed in the surface of the first side 113*i* of the rotating plate 112*i*, and the second disturbing portions 118*i* protrude from the surface of the second side 115*i* of the rotating plate 112*i*. However, the disclosure is not limited thereto. Preferably, a thermal conductivity of the first coating layer 190 and a thermal conductivity of the second coating layer 195 are respectively at least greater than 200 W/mK. Here, a material of the first coating layer 190 and a material of the second coating layer 195 respectively include graphite, diamond, gold, silver, copper, or aluminum, etc. In other words, in this embodiment, the surface area is increased through the first disturbing portions 117*i* and the second disturbing portions 118*i*, and the heat dissipation effect of the heat dissipation region B2 of the rotating plate 112*i* is improved through the disposition of the first coating layer 190 and the second coating layer 195.

Figure 11:
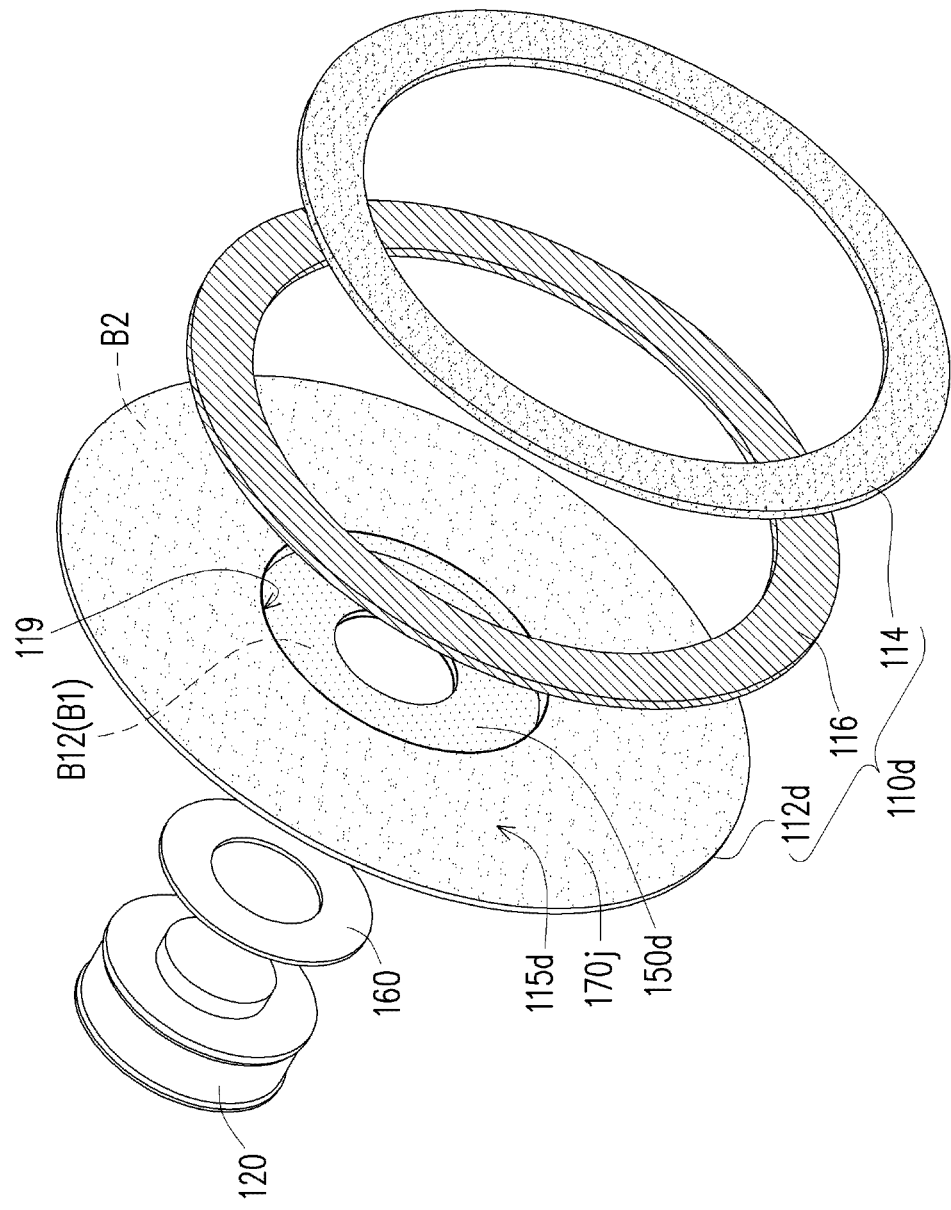
FIG. 11 is a schematic perspective exploded view of a wavelength conversion module according to an embodiment of the disclosure.

FIG. 11 is a schematic perspective exploded view of a wavelength conversion module according to an embodiment of the disclosure. Referring to both FIGS. 5C and 11, a wavelength conversion module 100*j* of this embodiment is similar to the wavelength conversion module 100*d* of FIG. 5C. The difference between the two embodiments is that, in this embodiment, the wavelength conversion module 100*j* further includes a heat dissipation layer 170*j*. The heat dissipation layer 170*j* is disposed on the rotating plate 112*d*, and is located at the heat dissipation region B2. Preferably, the heat dissipation layer 170*j* is a material having a high thermal conductivity. Here, the heat dissipation layer 170*j* may be formed by coating a high thermal conductivity material. The high thermal conductivity material is, for example, graphite, diamond, silver, copper, or aluminum, etc. In other words, in this embodiment, the heat dissipation layer 170*j* is coated on the rotating plate 112*d*, so as to improve the heat dissipation effect of the heat dissipation region B2 of the rotating plate 112*d*.

Based on the above, the embodiments of the disclosure have at least one of the following advantages or effects. In the design of the wavelength conversion module of the disclosure, the rotating plate includes the heat insulation region and the heat dissipation region, and the heat insulation region and the heat dissipation region do not overlap each other. That is, at least two regions with different functional properties of heat insulation and heat dissipation may be disposed on the rotating plate according to the requirements, so as to achieve the heat dissipation effect and heat insulation effect. Furthermore, the heat insulation region further includes the first heat insulation region located on the first side of the rotating plate and corresponding to the connection position of the driver and the second heat insulation region located on the second side of the rotating plate and corresponding to the connection position of the weight member. In this way, the heat energy may be effectively blocked from being transferred to the driver and the weight member, which may improve the reliability of the wavelength conversion module of the disclosure. In addition, the wavelength conversion module of the disclosure may also replace the weight member with the annular recess hole integrally formed with the rotating plate. In this way, the cost of the wavelength conversion module may be reduced, so that the structure of the wavelength conversion module is simplified. The vibration and the noise generated during the operation of the wavelength conversion module may also be avoided, which may improve the reliability and the service life of the wavelength conversion module. In addition, the projector adopting the wavelength conversion module of the disclosure may have the higher reliability and the longer service life, thereby enhancing the product competitiveness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, comprising a wavelength conversion wheel, a driver, a weight member, a first heat insulation layer and a second heat insulation layer, wherein:
   the wavelength conversion wheel comprises a rotating plate, and the rotating plate has a first side and a second side opposite to each other;
   the driver is connected to the first side of the rotating plate, and the driver drives the rotating plate to rotate around a rotation shaft of the driver as an axis; and
   the weight member is attached to the second side of the rotating plate, and the weight member rotates synchronously with the rotating plate around the rotation shaft as the axis,
   wherein the rotating plate comprises a heat insulation region and a heat dissipation region, wherein the heat insulation region and the heat dissipation region do not overlap each other;
   wherein the heat insulation region comprises a first heat insulation region and a second heat insulation region, the first heat insulation region is located at the first side of the rotating plate and corresponds to a connection position of the driver, and the second heat insulation region is located at the second side of the rotating plate and corresponds to a connection position of the weight member;

the first heat insulation layer is located at the first heat insulation region of the rotating plate and disposed between the rotating plate and the driver; and the second heat insulation layer is located at the second heat insulation region of the rotating plate and disposed between the rotating plate and the weight member, wherein the first heat insulation layer and the second heat insulation layer are respectively a surface treatment layer, and the surface treatment layer comprises a ceramization surface layer, a micro-arc oxidation surface layer, an oxide layer, or an inorganic salt layer, or wherein the first heat insulation layer and the second heat insulation layer are respectively a coated ceramic material layer, a sprayed ceramic material layer, a printed ceramic material layer, or a printed heat insulation plastic material layer.

2. The wavelength conversion module according to claim 1, wherein the wavelength conversion wheel further comprises:
a wavelength conversion layer, disposed at the second side of the rotating plate; and
a reflection layer, disposed at the second side of the rotating plate, wherein the wavelength conversion layer and the reflection layer are both located at the heat dissipation region, and the reflection layer is located between the rotating plate and the wavelength conversion layer.

3. The wavelength conversion module according to claim 1, wherein a thermal conductivity of the heat insulation region of the rotating plate is different from a thermal conductivity of the heat dissipation region, and the thermal conductivity of the heat insulation region ranges between 1 W/mK and 180 W/mK.

4. The wavelength conversion module according to claim 1, wherein the rotating plate further comprises:
a plurality of disturbing portions, located in the heat dissipation region, wherein the plurality of disturbing portions are recessed in a surface of the rotating plate corresponding to the heat dissipation region.

5. The wavelength conversion module according to claim 1, further comprising:
a heat dissipation layer, disposed at the rotating plate and located at the heat dissipation region, wherein the heat dissipation layer is a material having a high thermal conductivity.

6. A wavelength conversion module, comprising a wavelength conversion wheel, a driver, a first heat insulation layer and a second heat insulation layer, wherein:
the wavelength conversion wheel comprises a rotating plate, the rotating plate has a first side and a second side opposite to each other and comprises an annular recess hole recessed from the second side toward the first side; and
the driver is connected to the first side of the rotating plate, and the driver drives the rotating plate to rotate around a rotation shaft of the driver as an axis,
wherein the rotating plate comprises a heat insulation region and a heat dissipation region, wherein the heat insulation region and the heat dissipation region do not overlap each other;
wherein the heat insulation region comprises a first heat insulation region and a second heat insulation region, the first heat insulation region is located at the first side of the rotating plate and corresponds to a connection position of the driver, and the second heat insulation region corresponds to a position of the annular recess hole;

the first heat insulation layer is located at the first heat insulation region of the rotating plate and disposed between the rotating plate and the driver; and the second heat insulation layer is located at the second heat insulation region of the rotating plate, wherein the first heat insulation layer and the second heat insulation layer are respectively a surface treatment layer, and the surface treatment layer comprises a ceramization surface layer, a micro-arc oxidation surface layer, an oxide layer, or an inorganic salt layer, or wherein the first heat insulation layer and the second heat insulation layer are respectively a coated ceramic material layer, a sprayed ceramic material layer, a printed ceramic material layer, or a printed heat insulation plastic material layer.

7. The wavelength conversion module according to claim 6, wherein the wavelength conversion wheel further comprises:
a wavelength conversion layer, disposed at the second side of the rotating plate; and
a reflection layer, disposed on the second side of the rotating plate, wherein the wavelength conversion layer and the reflection layer are both located at the heat dissipation region, and the reflection layer is located between the rotating plate and the wavelength conversion layer.

8. The wavelength conversion module according to claim 7, wherein the rotating plate further comprises:
a plurality of first disturbing portions, disposed at the first side and located in the heat dissipation region, wherein the plurality of first disturbing portions are recessed in a surface of the first side; and
a plurality of second disturbing portions, disposed at the second side and located in the heat dissipation region outside the reflection layer, wherein the plurality of second disturbing portions are recessed in a surface of the second side.

9. The wavelength conversion module according to claim 8, further comprising:
a first coating layer, disposed on the surface of the first side of the rotating plate and covering the plurality of first disturbing portions; and
a second coating layer, disposed on the surface of the second side of the rotating plate and covering the plurality of second disturbing portions, wherein a thermal conductivity of the first coating layer and a thermal conductivity of the second coating layer are respectively at least greater than 200 W/mK.

10. The wavelength conversion module according to claim 9, wherein a material of the first coating layer and a material of the second coating layer respectively comprise graphite, diamond, gold, silver, copper, or aluminum.

11. The wavelength conversion module according to claim 6, wherein the rotating plate further comprises:
a heat dissipation layer, disposed at the rotating plate and located at the heat dissipation region, wherein the heat dissipation layer is a material having a high thermal conductivity.

12. The wavelength conversion module according to claim 6, further comprising:
a filler, disposed in the annular recess hole of the rotating plate.

13. A projector, comprising an illumination module, a light valve, and a projection lens, wherein:

the illumination module is configured to provide an illumination beam, and the illumination module comprises a light source device and a wavelength conversion module, wherein:
the light source device is configured to provide an exciting beam;
the wavelength conversion module is disposed on a transmission path of the exciting beam to convert the exciting beam to a conversion beam, the illumination beam comprises at least a portion of the conversion beam emitted from the wavelength conversion module, and the wavelength conversion module comprises a wavelength conversion wheel, a driver, a weight member, a first heat insulation layer and a second heat insulation layer, wherein:
the wavelength conversion wheel comprises a rotating plate, and the rotating plate has a first side and a second side opposite to each other;
the driver is connected to the first side of the rotating plate, and the driver drives the rotating plate to rotate around a rotation shaft of the driver as an axis; and
the weight member is attached to the second side of the rotating plate, and the weight member rotates synchronously with the rotating plate around the rotation shaft as the axis,
wherein the rotating plate comprises a heat insulation region and a heat dissipation region, wherein the heat insulation region and the heat dissipation region do not overlap each other;
wherein the heat insulation region comprises a first heat insulation region and a second heat insulation region, the first heat insulation region is located at the first side of the rotating plate and corresponds to a connection position of the driver, and the second heat insulation region is located at the second side of the rotating plate and corresponds to a connection position of the weight member;
the first heat insulation layer is located at the first heat insulation region of the rotating plate and disposed between the rotating plate and the driver; and
the second heat insulation layer is located at the second heat insulation region of the rotating plate and disposed between the rotating plate and the weight member,
wherein the first heat insulation layer and the second heat insulation layer are respectively a surface treatment layer, and the surface treatment layer comprises a ceramization surface layer, a micro-arc oxidation surface layer, an oxide layer, or an inorganic salt layer, or
wherein the first heat insulation layer and the second heat insulation layer are respectively a coated ceramic material layer, a sprayed ceramic material layer, a printed ceramic material layer, or a printed heat insulation plastic material layer;
the light valve is disposed on a transmission path of the illumination beam to convert the illumination beam into an image beam; and
the projection lens is disposed on a transmission path of the image beam to project the image beam out of the projector.

14. A projector, comprising an illumination module, a light valve, and a projection lens, wherein:
the illumination module is configured to provide an illumination beam, and the illumination module comprises a light source device and a wavelength conversion module, wherein:
the light source device is configured to provide an exciting beam;
the wavelength conversion module is disposed on a transmission path of the exciting beam to convert the exciting beam to a conversion beam, the illumination beam comprises at least a portion of the conversion beam emitted from the wavelength conversion module, and the wavelength conversion module comprises a wavelength conversion wheel, a driver, a first heat insulation layer and a second heat insulation layer, wherein:
the wavelength conversion wheel comprises a rotating plate, the rotating plate has a first side and a second side opposite to each other and comprises an annular recess hole recessed from the second side toward the first side; and
the driver is connected to the first side of the rotating plate, and the driver drives the rotating plate to rotate around a rotation shaft of the driver as an axis,
wherein the rotating plate comprises a heat insulation region and a heat dissipation region, wherein the heat insulation region and the heat dissipation region do not overlap each other;
wherein the heat insulation region comprises a first heat insulation region and a second heat insulation region, the first heat insulation region is located at the first side of the rotating plate and corresponds to a connection position of the driver, and the second heat insulation region is a position of the annular recess hole;
the first heat insulation layer is located at the first heat insulation region of the rotating plate and disposed between the rotating plate and the driver; and
the second heat insulation layer is located at the second heat insulation region of the rotating plate;
wherein the first heat insulation layer and the second heat insulation layer are respectively a surface treatment layer, and the surface treatment layer comprises a ceramization surface layer, a micro-arc oxidation surface layer, an oxide layer, or an inorganic salt layer, or
wherein the first heat insulation layer and the second heat insulation layer are respectively a coated ceramic material layer, a sprayed ceramic material layer, a printed ceramic material layer, or a printed heat insulation plastic material layer;
the light valve is disposed on a transmission path of the illumination beam to convert the illumination beam into an image beam; and
the projection lens is disposed on a transmission path of the image beam to project the image beam out of the projector.

* * * * *